(12) United States Patent
Iwai

(10) Patent No.: US 9,558,398 B2
(45) Date of Patent: Jan. 31, 2017

(54) PERSON BEHAVIOR ANALYSIS DEVICE, PERSON BEHAVIOR ANALYSIS SYSTEM, PERSON BEHAVIOR ANALYSIS METHOD, AND MONITORING DEVICE FOR DETECTING A PART OF INTEREST OF A PERSON

(71) Applicant: Panasonic Corporation, Osaka (JP)

(72) Inventor: Kazuhiko Iwai, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 136 days.

(21) Appl. No.: 14/319,042

(22) Filed: Jun. 30, 2014

(65) Prior Publication Data
US 2015/0010204 A1  Jan. 8, 2015

(30) Foreign Application Priority Data

Jul. 2, 2013 (JP) .................................. 2013-138747

(51) Int. Cl.
G06K 9/00 (2006.01)

(52) U.S. Cl.
CPC ....... *G06K 9/00335* (2013.01); *G06K 9/00771* (2013.01)

(58) Field of Classification Search
CPC .......................... G06K 9/00771; G06K 9/00335
See application file for complete search history.

(56) References Cited

U.S. PATENT DOCUMENTS 5,822,077 A * 10/1998 Sasaki ................ H04N 1/00885
340/435
6,606,412 B1 * 8/2003 Echigo ............... G06K 9/00342
375/240.19

(Continued)

FOREIGN PATENT DOCUMENTS

JP   2001-128814   5/2001
JP   2009-048430   3/2009

(Continued)

OTHER PUBLICATIONS

U.S. Appl. No. 14/284,580 to Yuichiro Takemoto et al., which was filed on May 22, 2014.

*Primary Examiner* — Utpal Shah
(74) *Attorney, Agent, or Firm* — Greenblum & Bernstein, P.L.C.

(57) ABSTRACT

A behavior analysis/monitoring device includes: a person detection unit configured to detect a person(s) from image information obtained by capturing images covering an area around an item placement area; a part-of-interest detection unit configured to detect, for each person detected by the person detection unit, a part of interest set in a part of an upper body of the person excluding hands and arms; a position measurement unit configured to measure a position of the part of interest detected by the part-of-interest detection unit; and an item pick-up action determination unit configured to obtain a displacement of the part of interest based on the position of the part of interest obtained by the position measurement unit and to determine whether each person detected by the person detection unit performed an item pick-up action based on the displacement of the part of interest of the person.

20 Claims, 19 Drawing Sheets

(56) References Cited

U.S. PATENT DOCUMENTS

| | | | |
|---|---|---|---|
| 7,903,141 B1* | 3/2011 | Mariano | G06K 9/00771 348/143 |
| 8,010,402 B1* | 8/2011 | Sharma | G06Q 10/00 705/14.49 |
| 8,219,438 B1* | 7/2012 | Moon | G06Q 30/0201 705/7.29 |
| 8,879,787 B2* | 11/2014 | Ikenoue | G06F 3/012 382/103 |
| 9,224,049 B2* | 12/2015 | Feris | G06K 9/00771 |
| 2003/0099375 A1* | 5/2003 | Sefcik | G06T 7/20 382/103 |
| 2003/0174099 A1* | 9/2003 | Bauer | G06K 7/0008 343/893 |
| 2006/0010028 A1* | 1/2006 | Sorensen | G06Q 30/02 705/7.34 |
| 2006/0149628 A1* | 7/2006 | Chefalas | G06Q 30/02 705/14.18 |
| 2008/0031491 A1* | 2/2008 | Ma | G06K 9/00771 382/103 |
| 2008/0306756 A1* | 12/2008 | Sorensen | G06Q 30/02 705/27.1 |
| 2009/0153328 A1* | 6/2009 | Otani | G06Q 10/087 340/572.1 |
| 2009/0240590 A1* | 9/2009 | Or | G06Q 30/02 705/14.58 |
| 2010/0303302 A1* | 12/2010 | Kipman | G06K 9/00369 382/107 |
| 2010/0318566 A1* | 12/2010 | Yoshio | G06F 17/30802 707/774 |
| 2011/0085700 A1* | 4/2011 | Lee | G06Q 30/02 382/103 |
| 2013/0027561 A1 | 1/2013 | Lee et al. | |
| 2013/0030875 A1 | 1/2013 | Lee et al. | |
| 2013/0182904 A1* | 7/2013 | Zhang | H04N 7/18 382/103 |
| 2014/0222501 A1 | 8/2014 | Hirakawa et al. | |

FOREIGN PATENT DOCUMENTS

| | | |
|---|---|---|
| JP | 2011-253344 | 12/2011 |
| JP | 2012-088878 | 5/2012 |
| JP | 2012-173903 | 9/2012 |

* cited by examiner

Fig.10

| Y coordinate value of head center | height (cm) | arm length (cm) |
|---|---|---|
| $Y_{141\sim160}$ | 141~160 | 64 |
| $Y_{161\sim170}$ | 161~170 | 72 |
| $Y_{171\sim190}$ | 171~190 | 79 |

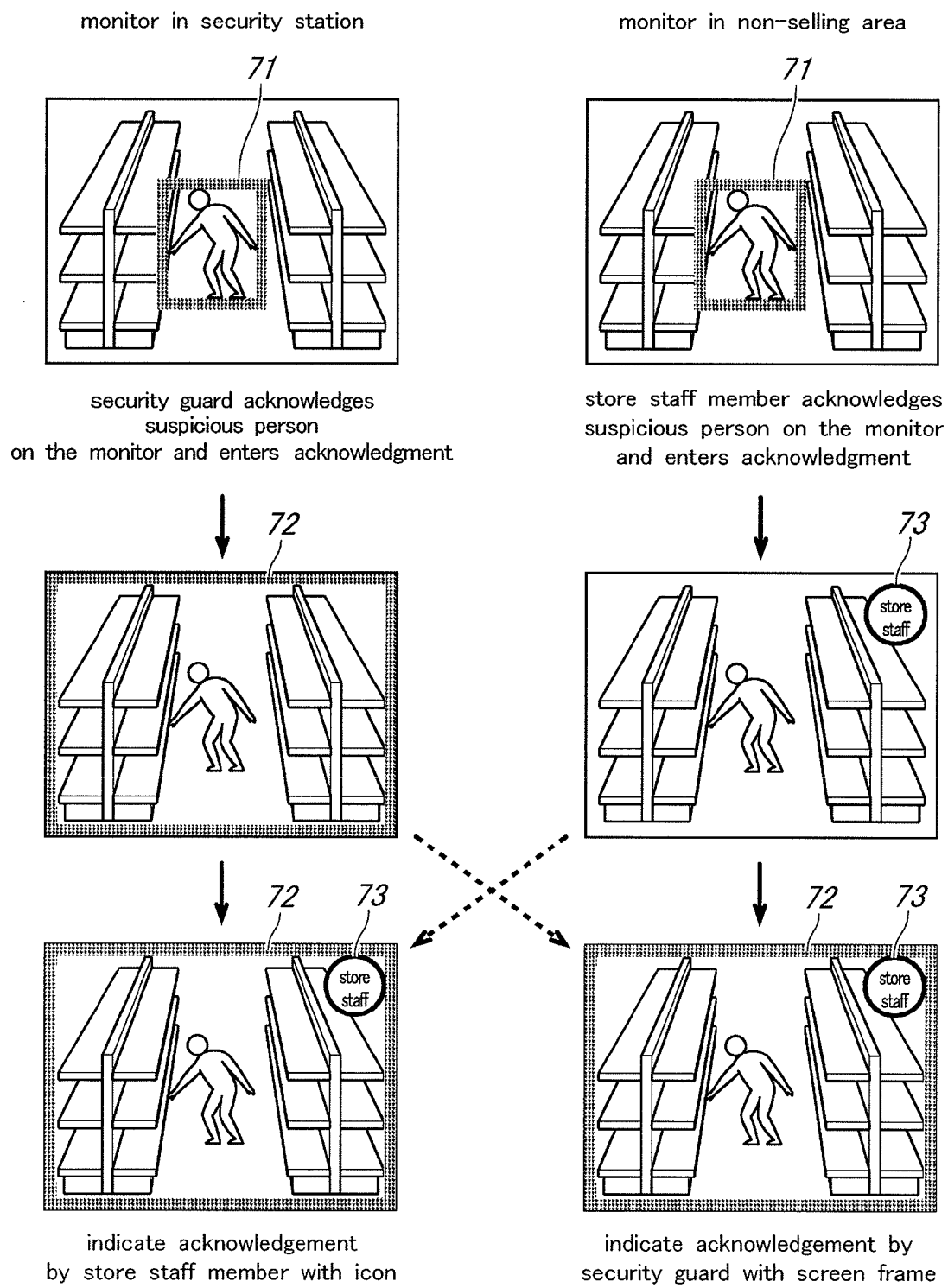

PERSON BEHAVIOR ANALYSIS DEVICE, PERSON BEHAVIOR ANALYSIS SYSTEM, PERSON BEHAVIOR ANALYSIS METHOD, AND MONITORING DEVICE FOR DETECTING A PART OF INTEREST OF A PERSON

TECHNICAL FIELD

The present invention relates to a person behavior analysis device, person behavior analysis system and person behavior analysis method for performing analysis of item pick-up actions or actions of picking up an item placed in an item placement area, and also relates to a monitoring device for notifying a monitoring person of a person performing an item pick-up action.

BACKGROUND OF THE INVENTION

An action of a customer picking up an item placed on a display shelf in a retail store such as a convenience store or a supermarket may indicate that the customer is interested in the item, and if the customer ended up in not purchasing the item despite having picked it up, it may be considered that there might be some problem in item description, way of displaying items, etc. Thus, by analyzing item pick-up actions of customers to pick up items on display shelves, it is possible to obtain information useful in running the store.

To perform such analysis of item pick-up actions of customers, it is necessary to observe the behavior of each customer present in the vicinity of a display shelf and detect item pick-up actions, and in this regard, technology is conventionally known in which image recognition technology is used to detect item pick-up actions of customers from captured images of an area around a display shelf (refer to JP2009-048430A, JP2012-173903A, JP2012-088878A, JP2011-253344A and JP2001-128814A, for example).

SUMMARY OF THE INVENTION

However, the aforementioned conventional technology detects movement of a hand or arm of each person from captured images in which the hand or arm of the person is included, and detects an item pick-up action of picking up an item placed on a display shelf based on the detected movement of the hand or aim, and therefore, when the captured images include neither the hand nor the arm of a person (customer), it is not possible to accurately detect an item pick-up action of the customer, and this can significantly reduce the accuracy of analysis of the item pick-up actions of customers.

Specifically, the cameras for monitoring the interior of a store are typically mounted on the ceiling, and therefore, the hand and arm of a person reaching for an item on a display may be hidden from view by the display shelf itself, the body of the person reaching for an item on the display shelf or the body of another person in front of the display shelf, whereby images including the hand or arm of the person extended toward an item may not be captured, and in such a case, it is not possible to detect an item pick-up action.

It may be conceived to set up a camera at such a place where the camera can reliably capture images including the hand and arm of a person extended toward an item on a display shelf. However, this would require setting up of a camera specifically provided for person behavior analysis, and thus, would lead to a higher installation cost.

The present invention is made to solve the foregoing problems in the prior art, and a primary object of the present invention is to provide a person behavior analysis device, person behavior analysis system, person behavior analysis method and monitoring device configured to be able to detect an action of a person picking up an item in an item placement area even when neither the movement of a hand nor the movement of an arm of the person can be detected.

To achieve the foregoing object, in a first aspect of the present invention, there is provided a person behavior analysis device for performing analysis of item pick-up actions, which are actions of picking up an item placed in an item placement area, the device including: a person detection unit configured to detect a person(s) from image information obtained by capturing images covering an area around the item placement area; a part-of-interest detection unit configured to detect, for each person detected by the person detection unit, a part of interest set in a part of an upper body of the person excluding hands and arms; a position measurement unit configured to measure a position of the part of interest detected by the part-of-interest detection unit; an item pick-up action determination unit configured to obtain a displacement of the part of interest based on the position of the part of interest obtained by the position measurement unit and to determine whether each person detected by the person detection unit performed an item pick-up action based on the displacement of the part of interest of the person; and an output information generation unit configured to generate output information representing a result of analysis based on a result of determination by the item pick-up action determination unit.

When a person performs an item pick-up action of picking up an item placed in an item placement area, the posture of the person changes, particularly an upper body of the person moves, along with a motion of extending the hand toward an item in the item placement area. According to the foregoing structure, a displacement of a part of interest set in a part of an upper body of a person excluding the hands and arms is observed, whereby it is possible to determine whether the person performed an item pick-up action even when neither the movement of the hand nor the movement of the arm of the person can be detected. This makes it possible to perform analysis of item pick-up actions with high accuracy. Further, since the person behavior analysis can be performed using conventional monitoring camera(s) without use of a camera specifically provided for person behavior analysis, the installation cost can be reduced.

In a second aspect of the present invention, the part of interest is a head or shoulder of a person.

According to this structure, since the position of the head or shoulder of a person can be detected easily, the displacement of the part of interest can be obtained with high accuracy.

In a third aspect of the present invention, the item placement area includes a display shelf having a plurality of shelf boards on which items are placed such that the shelf boards are spaced apart in a vertical direction.

According to this structure, since the determination of whether an item pick-up action was performed is made based on the fact that the posture of a person changes along with a motion of extending the hand toward an item to pick it up, when the display shelf has multiple vertically spaced shelf boards on which items are placed, it is possible to determine with high accuracy which of the multiple shelf boards an item pick-up action was performed to pick up an item from. As such display shelves are commonly used in retail stores, the above feature of the present invention allows the person behavior analysis in retail stores to be performed in detail with high accuracy.

In a fourth aspect of the present invention, the person behavior analysis device further includes: a vicinity area setting unit configured to set, around the item placement area, a vicinity area which is a maximum area in which a person can touch an item in the item placement area by extending a hand; and an area entry determination unit configured to determine that, of the persons detected by the person detection unit, a person who did not enter the vicinity area is a person who could not perform the item pick-up action.

According to this structure, a person who did not enter the vicinity area can be determined to be a person who could not perform an item pick-up action because such a person could not touch an item even if the person extended his/her arm. The persons determined in the area entry determination to be persons who could not perform an item pick-up action are excluded from the determination performed by the item pick-up action determination unit, and thus, persons to be included in the determination performed by the item pick-up action determination unit can be narrowed down. Further, the area entry determination is performed based on the planar positional relationship and thus can be carried out easily, contributing to increase in the overall processing speed as well as improvement in the accuracy of the item pick-up action determination.

In a fifth aspect of the present invention, the vicinity area setting unit sets the vicinity area based on an arm length estimated from a result of measurement by the position measurement unit in accordance with correlation between height and arm length.

According to this structure, the vicinity area can be set easily and with high precision.

In a sixth aspect of the present invention, the person behavior analysis device further includes: a staying time measurement unit configured to measure, for each person entering the vicinity area, a staying time in the vicinity area; and a staying time assessment unit configured to determine that, of the persons detected by the person detection unit, a person whose staying time does not reach a predetermined threshold value is a person who could not perform the item pick-up action.

Since it requires a certain time to perform an item pick-up action of picking up an item placed in an item placement area, a person whose staying time did not reach a predetermined threshold value can be determined to be a person who could not perform an item pick-up action. The persons determined in the staying time assessment to be persons who could not perform an item pick-up action are excluded from the determination performed by the item pick-up action determination unit, and thus, persons to be included in the determination performed by the item pick-up action determination unit can be narrowed down. Further, the staying time measurement can be done easily based on the entry time into the vicinity area and the exit time from the vicinity area and the staying time assessment can be carried out by simple comparison of numerical values, and this contributes to increase in the overall processing speed as well as improvement in the accuracy of the item pick-up action determination.

In a seventh aspect of the present invention, the item pick-up action determination unit determines whether each person entering the vicinity area performed the item pick-up action based on a displacement of the part of interest of the person with respect to a position of the part of interest when the person entered the vicinity area in an upright posture.

According to this structure, the item pick-up action determination can be performed easily with high accuracy.

In an eighth aspect of the present invention, the item pick-up action determination unit determines whether each person detected by the person detection unit performed the item pick-up action based on a positional relationship between a reference position set in the item placement area and the part of interest of the person.

According to this structure, the item pick-up action determination can be performed easily with high accuracy.

In a ninth aspect of the present invention, the position measurement unit measures a central point of a head of each person.

According to this structure, since the central point of the head (head center) can be detected highly accurately from the result of detection of the head, the displacement of the part of interest can be obtained even more accurately.

In a tenth aspect of the present invention, the position measurement unit obtains information relating to an apparent size of the part of interest in captured images from the image information, and measures the position of the part of interest based on a change in the apparent size of the part of interest.

According to this structure, since the displacement of the part of interest in the direction of depth as seen from the imaging device is obtained based on the change in the apparent size of the part of interest, it is possible to obtain an actual displacement of the part of interest with high accuracy.

In an eleventh aspect of the present invention, the person detection unit detects a plurality of persons who are present in the vicinity of the item placement area at the same time, the part-of-interest detection unit detects the part of interest of each person detected by the person detection unit, the position measurement unit measures a position of the part of interest of each person detected by the part-of-interest detection unit, and the item pick-up action determination unit determines whether each person detected by the person detection unit performed the item pick-up action.

According to this structure, even in a situation where there are multiple persons around the item placement area simultaneously, it is possible to determine whether each person performed an item pick-up action. In the situation where there are multiple persons around the item placement area simultaneously, the arm and hand of a person performing an item pick-up action may be hidden from view by another person so that neither the movement of the hand nor the movement of the arm of the person performing an item pick-up action can be detected. However, in the foregoing structure, since a displacement of a part of interest (preferably, a head) set in a part of an upper body of each person excluding the hands and arms is observed, it is possible to determine with high accuracy whether each person performed an item pick-up action.

In a twelfth aspect of the present invention, a plurality of item placement areas are arranged for respective categories of items, and the output information generation unit generates output information relating to a result of totaling of at least one of a number of occurrences of item pick-up actions for each item placement areas and staying times of detected persons in an area around each item placement area.

According to this structure, a user such as a manager of the store can know the state of occurrence of item pick-up actions performed by persons at each of the item placement areas arranged to correspond to respective item categories and the state of staying of persons around each item placement area. This allows the user to assess, for each item category, the purchasing characteristics of persons, appropriateness of arrangement of the items and way of displaying the items, etc.

In a thirteenth aspect of the present invention, the output information generation unit generates output information relating to a display image for displaying the result of totaling superimposed on an image representing the plurality of item placement areas arranged in accordance with an actual arrangement of the item placement areas.

According to this structure, a user such as a manager of the store can readily know the state of occurrence of item pick-up actions performed by persons at each item display area and the state of staying of persons around each item placement area.

In a fourteenth aspect of the present invention, there is provided a person behavior analysis system for performing analysis of item pick-up actions, which are actions of picking up an item placed in an item placement area, the system including: an imaging device configured to capture an image of an area around the item placement area; and a plurality of information processing devices, wherein the plurality of information processing devices jointly include: a person detection unit configured to detect a person(s) from image information obtained by capturing images by the imaging device; a part-of-interest detection unit configured to detect, for each person detected by the person detection unit, a part of interest set in a part of an upper body of the person excluding hands and arms; a position measurement unit configured to measure a position of the part of interest detected by the part-of-interest detection unit; an item pick-up action determination unit configured to obtain a displacement of the part of interest based on the position of the part of interest obtained by the position measurement unit and to determine whether each person detected by the person detection unit performed an item pick-up action based on the displacement of the part of interest of the person; and an output information generation unit configured to generate output information representing a result of analysis based on a result of determination by the item pick-up action determination unit.

According to this structure, it is possible to determine whether a person performed an item pick-up action even when neither the movement of the hand nor the movement of the arm of the person can be detected, and therefore, it is possible to perform analysis of item pick-up actions with high accuracy, similarly to the structure according to the first aspect of the present invention.

In a fifteenth aspect of the present invention, there is provided a person behavior analysis method for performing, with an information processing device, analysis of item pick-up actions, which are actions of picking up an item placed in an item placement area, the method including: a first step of detecting a person(s) from image information obtained by capturing images covering an area around the item placement area; a second step of detecting, for each person detected by the first step, a part of interest set in a part of an upper body of the person excluding hands and arms; a third step of measuring a position of the part of interest detected by the second step; a fourth step of obtaining a displacement of the part of interest from the position of the part of interest obtained by the third step and determining whether each person detected by the first step performed an item pick-up action based on the displacement of the part of interest of the person; and a fifth step of generating output information representing a result of analysis based on a result of determination by the fourth step.

According to this structure, it is possible to determine whether a person performed an item pick-up action even when neither the movement of the hand nor the movement of the arm of the person can be detected, and therefore, it is possible to perform analysis of item pick-up actions with high accuracy, similarly to the structure according to the first aspect of the present invention.

In a sixteenth aspect of the present invention, there is provided a monitoring device for notifying a monitoring person of a person performing an item pick-up action which is an action of picking up an item placed in a placement area, including: a person detection unit configured to detect a person(s) from image information obtained by capturing images covering an area around the item placement area; a part-of-interest detection unit configured to detect, for each person detected by the person detection unit, a part of interest set in a part of an upper body of the person excluding hands and arms; a position measurement unit configured to measure a position of the part of interest detected by the part-of-interest detection unit; an item pick-up action determination unit configured to obtain a displacement of the part of interest based on the position of the part of interest obtained by the position measurement unit and to determine whether each person detected by the person detection unit performed an item pick-up action based on the displacement of the part of interest of the person; and a notification unit configured to generate notification information relating to a person performing the item pick-up action based on a result of determination by the item pick-up action determination unit.

According to this structure, it is possible to determine whether a person performed an item pick-up action even when neither the movement of the hand nor the movement of the arm of the person can be detected, and therefore, it is possible to reliably notify a monitoring person of a person performing an item pick-up action.

BRIEF DESCRIPTION OF THE DRAWINGS

Now the present invention is described in the following in terms of preferred embodiments thereof with reference to the appended drawings, in which:

FIG. 10 is an explanatory diagram showing an arm length estimation table used by an arm length estimation unit 50;

FIG. 19 is an explanatory diagram showing display screens on monitors 51, 52 set up in a security station and a non-selling area of a store, respectively.

DETAILED DESCRIPTION OF THE PREFERRED EMBODIMENTS

In the following, description will be made of an exemplary embodiment of the present invention with reference to the drawings.

First Embodiment

Figure 1:
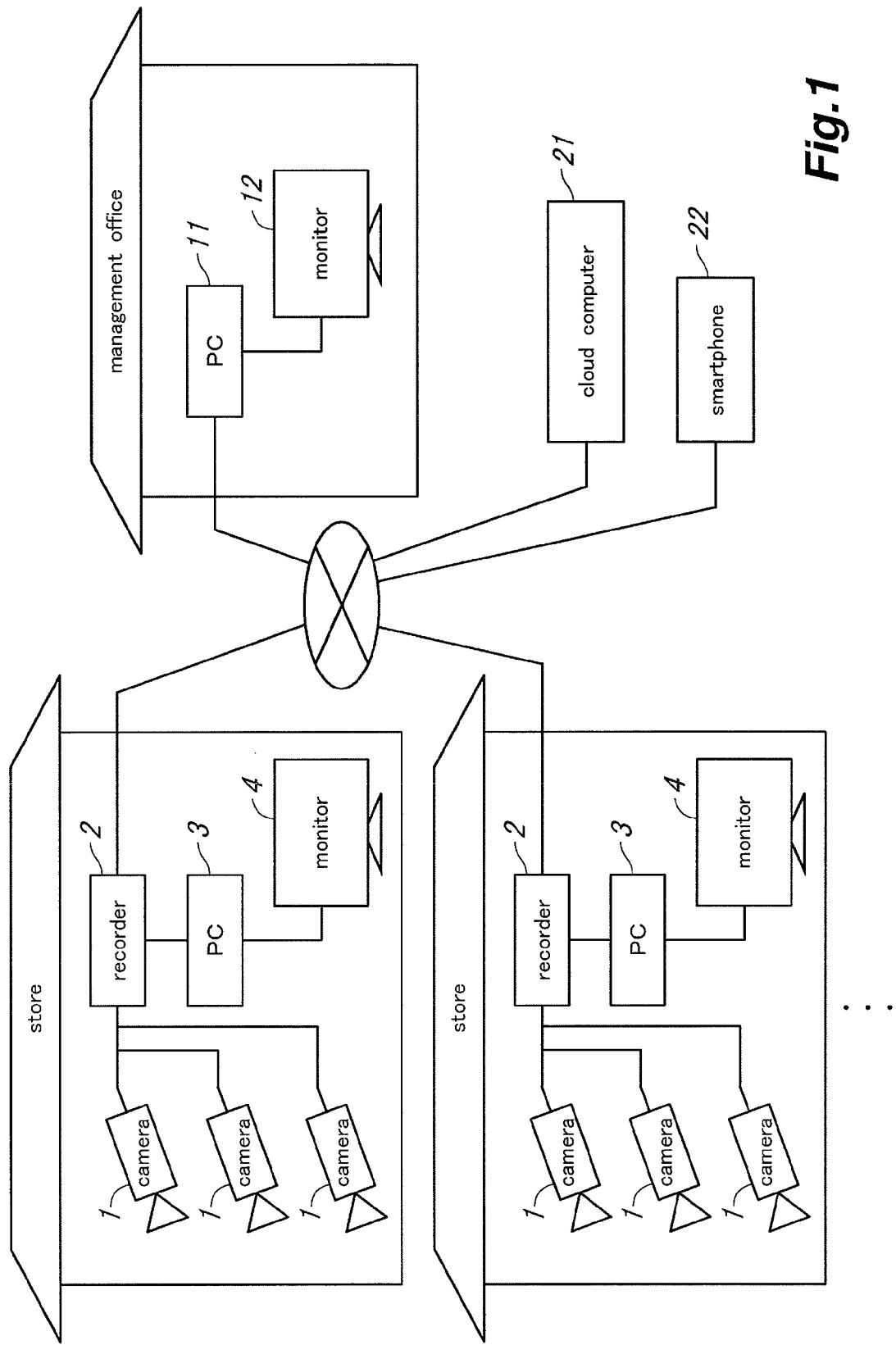
FIG. 1 is a diagram showing an overall structure of a person behavior analysis system according to the first embodiment.

FIG. 1 is a diagram showing an overall structure of a person behavior analysis system according to the first embodiment. The person behavior analysis system is designed for a retail store chain such as a convenience store chain, and includes cameras (imaging device) 1, a recorder (image recording device) 2, a personal computer (PC) (person behavior analysis device, browser device) 3, and a monitor 4, which are set up at each of the multiple stores within the chain. Further, the person behavior analysis system includes a PC (browser device) 11 and a monitor 12, which are set up at a management office overseeing the multiple stores.

The cameras 1 are set up at appropriate locations in the store to capture images of the various areas in the store, and image information obtained thereby is recorded by the recorder 2. The PC 3 set up at the store and the PC 11 set up at the management office can display the real-time images of various areas in the store captured by the cameras 1 or the past images of various areas in the store recorded by the recorder 2, and this allows a user at the store or the management office to check the situation in the store.

The PC 3 set up at the store is configured to realize a person behavior analysis device that performs analysis of the behavior of customers in the store. The analysis result information generated by the PC 3 set up at the store can be displayed on the PC 3 itself, and also, is transmitted to the PC 11 set up at the management office, such that the information can be displayed on the PC 11. Thus, the PCs 3 and 11 are each configured to serve as a browser device that allows a user to view the analysis result information.

Figure 2:
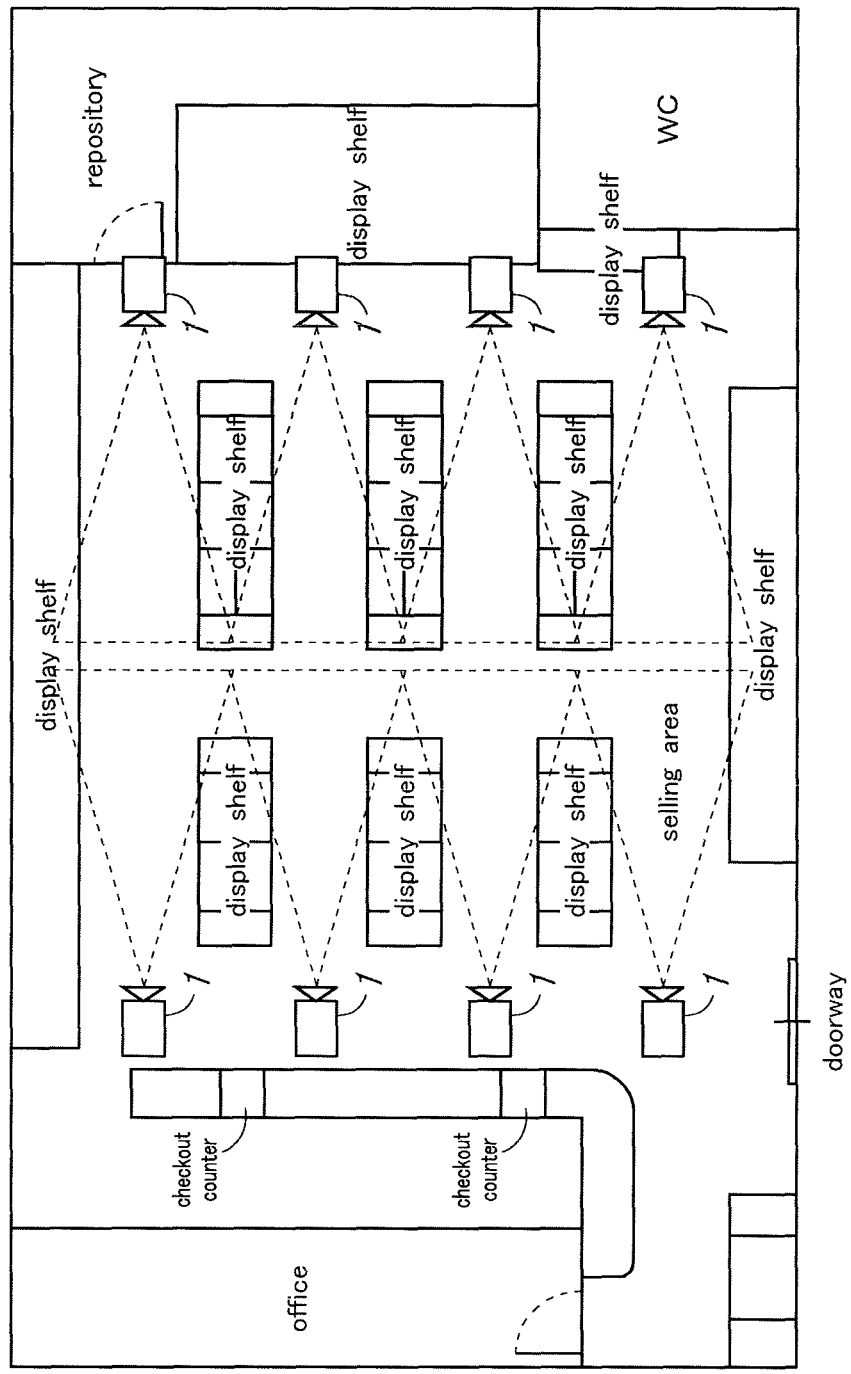
FIG. 2 is a plan view showing an exemplary arrangement of cameras 1 in a store.
Figure 3:
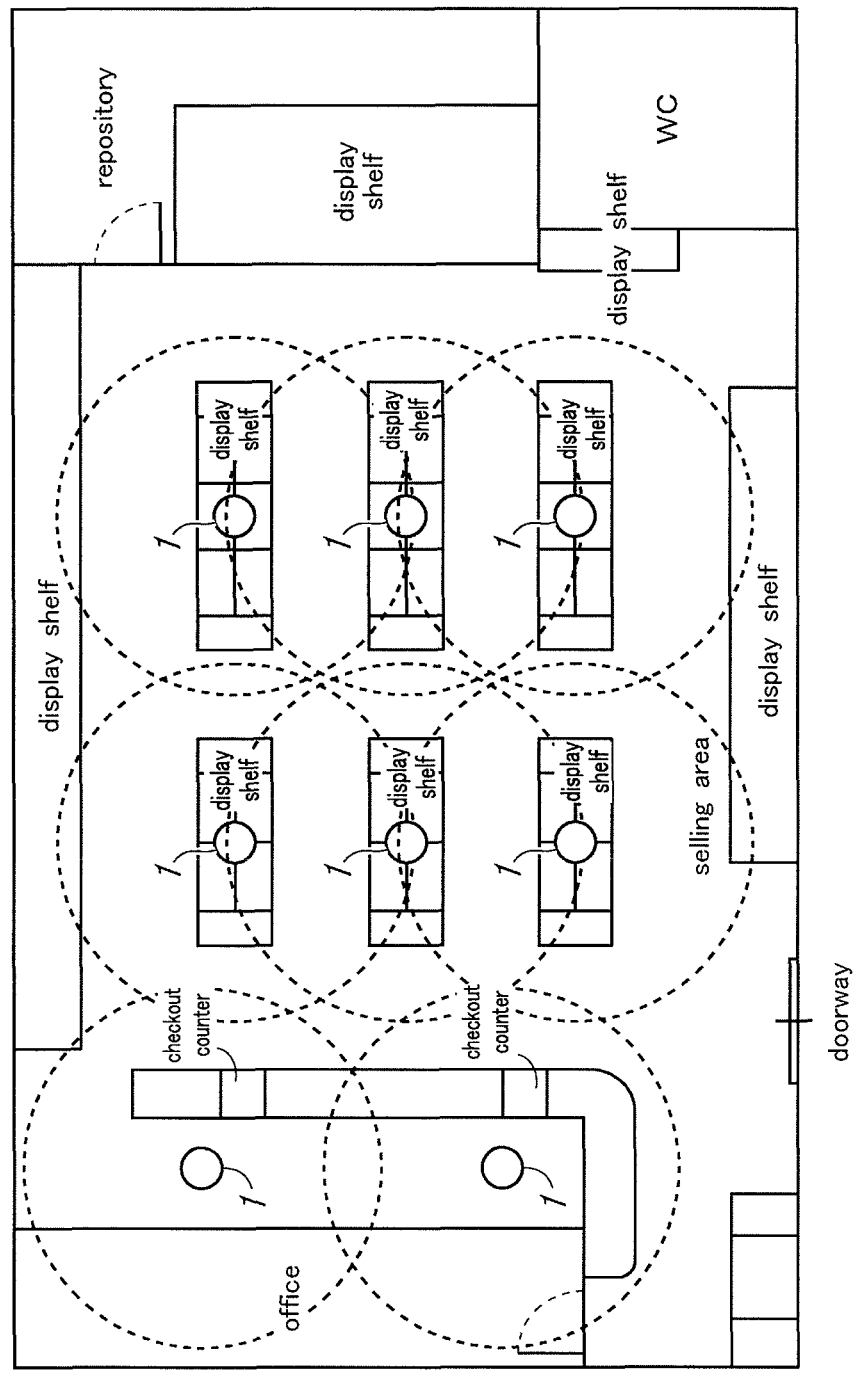
FIG. 3 is a plan view showing another exemplary arrangement of cameras 1 in a store.

FIGS. 2 and 3 are plan views each showing an exemplary arrangement of the cameras 1 in the store. As shown in FIGS. 2 and 3, in the store, multiple display shelves (item placement areas) are set up for respective categories (kinds) of items for sale, and multiple cameras 1 are mounted at appropriate positions to mainly capture images of areas around the display shelves.

Specifically, in the example shown in FIG. 2, the cameras 1 are mounted on the ceiling at the ends of the passages between the display shelves so as to capture images of the passages. In the example shown in FIG. 3, each camera 1 is constituted of an omnidirectional camera using a fish-eye lens to have a view range of 360 degrees, and is mounted on the ceiling at a position just above the center of a corresponding display shelf, whereby images of the passages between the display shelves can be captured.

Figure 4:
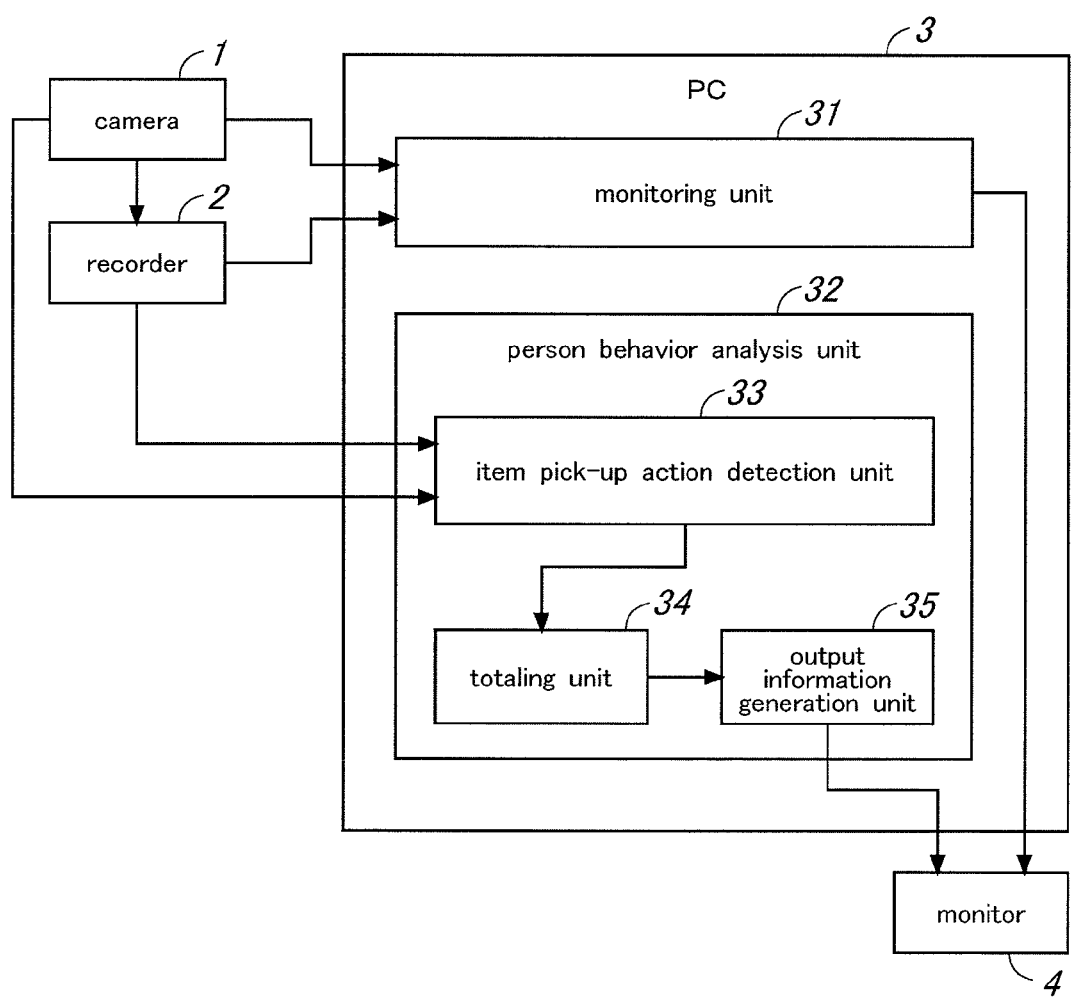
FIG. 4 is a block diagram schematically showing a functional structure of a PC 3 provided at a store.

Next, a description will be given of the PC 3 set up at each store as shown in FIG. 1. FIG. 4 is a block diagram schematically showing a functional structure of the PC 3 set up at the store.

The PC3 includes a monitoring unit 31 and a person behavior analysis unit 32. The monitoring unit 31 allows the PC 3 to function as a monitoring system for monitoring the interior of the store. The monitoring unit 31 controls the operation of the cameras 1 and the recorder 2 and enables a user to have a real-time view of the images of various areas in the store captured by the cameras 1 and to view the image of various areas in the store recorded in the recorder 2.

The person behavior analysis unit 32 performs analysis of the behavior of customers in the store. Specifically, in the present embodiment, the person behavior analysis unit 32 performs analysis of item pick-up actions or actions of picking up an item placed on any one of the display shelves, and includes, as units relating to this analysis, an item pick-up action detection unit 33, a totaling unit 34 and an output information generation unit 35.

The item pick-up action detection unit 33 performs a process of detecting an item pick-up action by determining whether a person present in an area around a display shelf performed an item pick-up action of picking up an item placed on the display shelf. The totaling unit 34 performs, based on the result of detection by the item pick-up action detection unit 33, a process of totaling a number of detected item pick-up actions (actions of picking up an item placed on any one of the display shelves) or the like for each predetermined time period (e.g., one day). The output information generation unit 35 performs a process of generating output information representing analysis result based on the result of totaling by the totaling unit 34.

It is to be noted that the monitoring unit 31 and the person behavior analysis unit 32 are realized by executing programs for monitoring and person behavior analysis by the CPU of the PC 3. These programs may be pre-installed in the PC 3 as an information processing device to embody a device dedicated for monitoring and person behavior analysis, or may be provided to a user in the form stored in an appropriate recording medium as an application program that can be run on a general-purpose OS.

Figure 5:
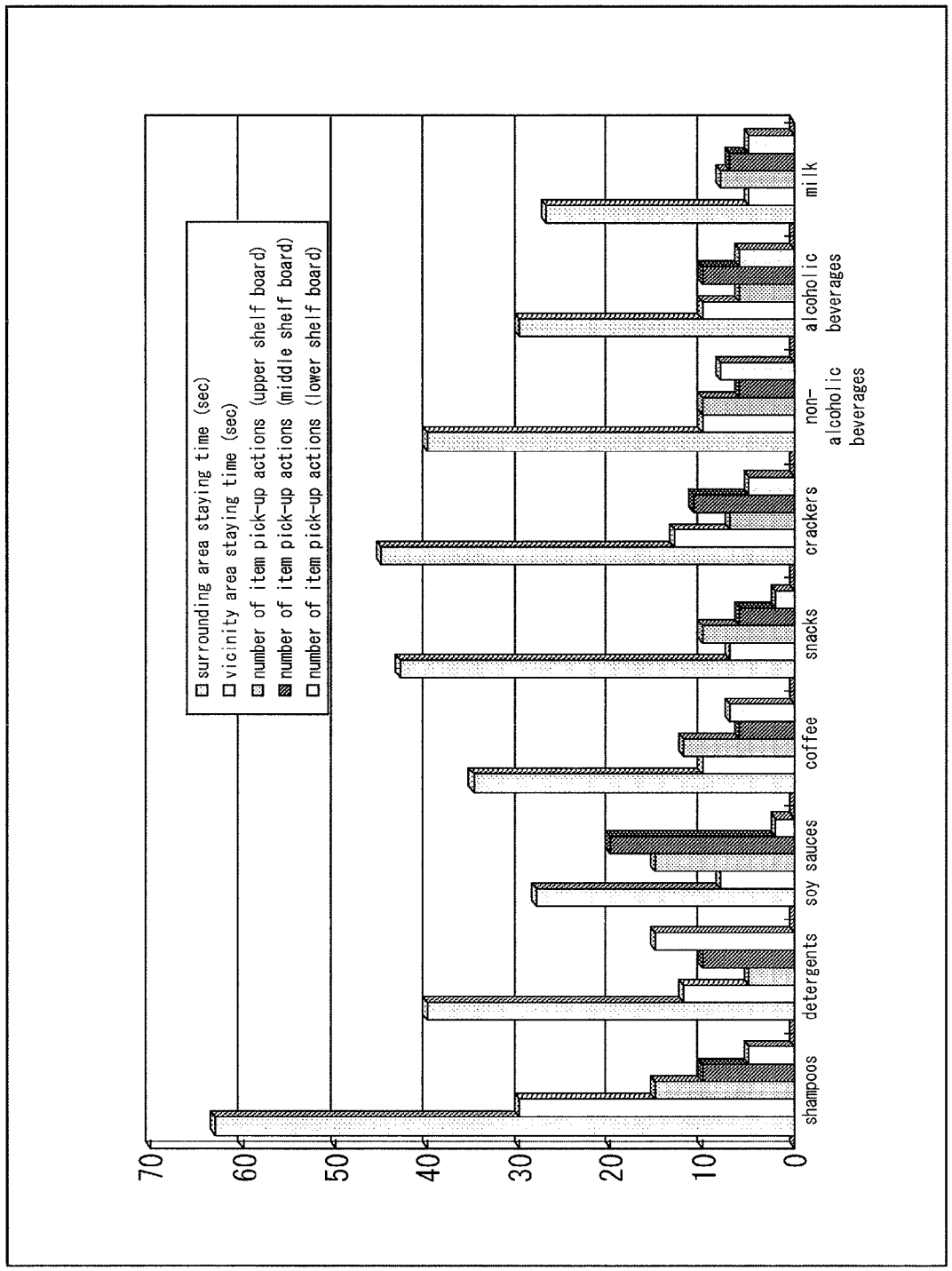
FIG. 5 is an explanatory diagram showing an example of a screen showing a result of analysis performed by a person behavior analysis unit 32.
Figure 6:
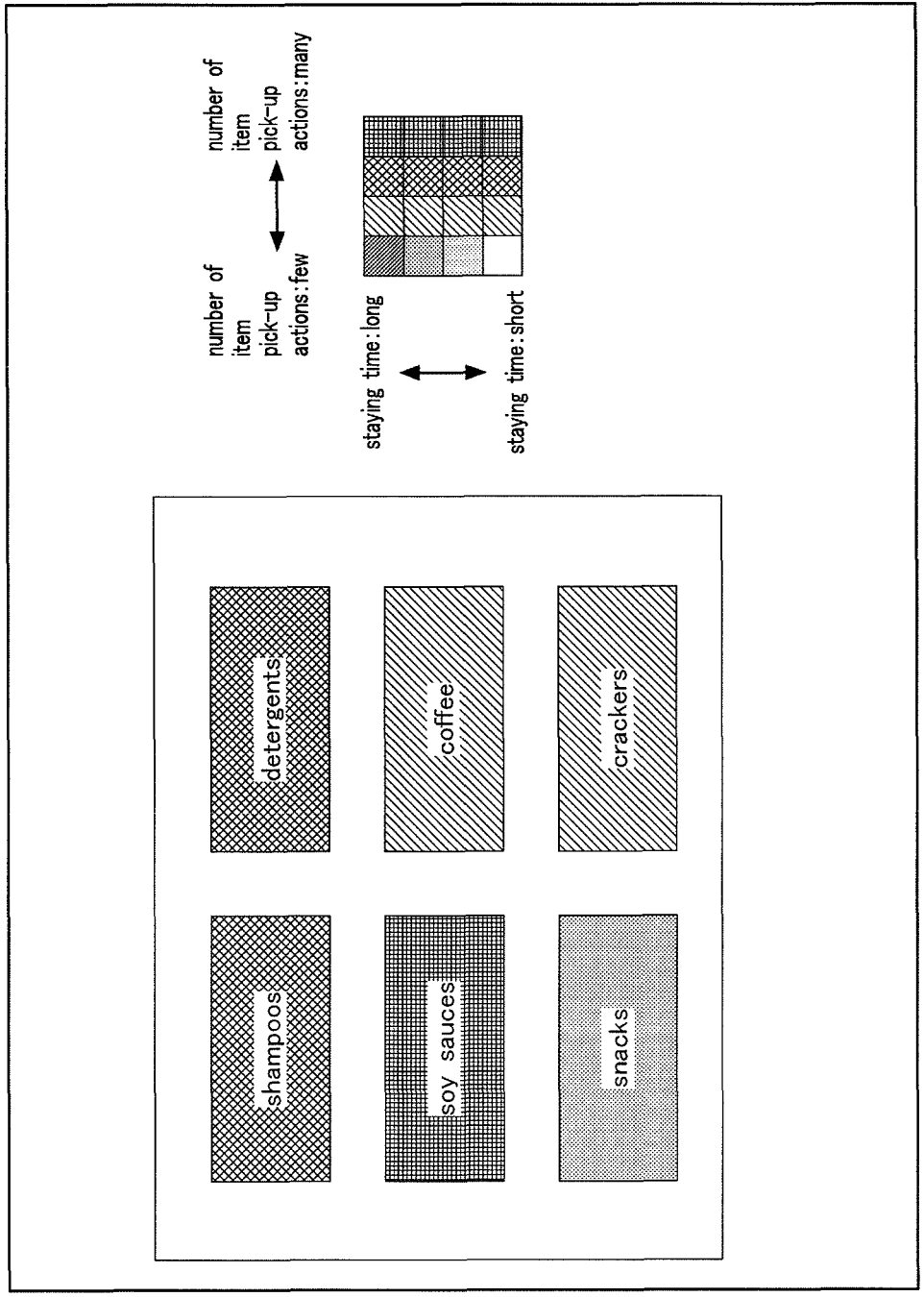
FIG. 6 is an explanatory diagram showing another example of a screen showing a result of analysis performed by the person behavior analysis unit 32.

Next, a description will be given of a result of analysis performed by the person behavior analysis unit 32 shown in FIG. 4. FIGS. 5 and 6 are explanatory diagrams showing examples of the analysis result screen showing a result of analysis performed by the person behavior analysis unit 32. This analysis result screen is to be displayed on the monitors 4 and 12 set up at the store and the management office, respectively.

The analysis result screen shown in FIG. 5 shows a result of the analysis in the form of a bar chart showing, for each of the display shelves provided to correspond to respective item categories (shampoos, detergents, soy sauces, coffee, snacks, crackers, non-alcoholic beverages, alcoholic beverages, and milk), a surrounding area staying time, a vicinity area staying time, and a number of item pick-up actions detected for each of the shelf boards (e.g., upper, middle and lower shelf boards) of the display shelf.

The surrounding area staying time indicates a length of time (average) for which persons stayed in a surrounding area (see FIG. 9) set around each display shelf, while the vicinity area staying time indicates a length of time (average) for which persons stayed in a vicinity area (see FIG. 9) set around each display shelf. The surrounding area and the vicinity area will be described in detail later. The number of detected item pick-up actions indicates a number of times (average) customers picked up items on each display shelf.

Thus, in the present embodiment, totaling result information relating to the number of item pick-up actions detected for each of the multiple display shelves arranged to correspond to the respective item categories and the staying time indicating the time for which persons stayed around each display shelf is generated by the person behavior analysis unit 32 and displayed on the monitors 4, 12, and thus, a user such as a manager of the store can know the state of occurrence of item pick-up actions performed by customers at each display shelf and the state of staying of customers around each display shelf. This allows the user to assess, for each item category, the purchasing characteristics of customers, appropriateness of arrangement of the items and way of displaying the items, etc.

For example, with regard to the display shelf (category) of soy sauces, the staying time is relatively short while the number of item pick-up actions is relatively large, and based on such information, which suggests a purchasing characteristic of customers that many customers determine which item to purchase in advance or make a planned purchase (designation purchase). On the other hand, with regard to the display shelf (category) of shampoos, the staying time is relatively long while the number of item pick-up actions is relatively small, which suggests a purchasing characteristic of customers that a relatively small number of customers make a planned purchase or that there may be some problem in the arrangement of items on the display shelf or in the way of displaying the items.

The analysis result screen shown in FIG. 6 includes a display image in which the result of totaling for each display shelf is shown superimposed on a corresponding one of the images representing the respective display shelves and arranged in accordance with the actual arrangement of the display shelves in the store. The result of totaling displayed in this analysis result screen indicates the surrounding area staying time and the number of item pick-up actions detected for each display shelf, and is represented in the form of a graphical representation known as a heat map in which the values obtained as the result of totaling are represented as colors or shades of colors.

As described above, in the present embodiment, a display image in which the result of totaling for each display shelf is shown superimposed on a corresponding one of the images representing the respective display shelves and arranged in accordance with the actual arrangement is displayed, and thus, a user such as a manager of the store can readily know the state of occurrence of item pick-up actions performed by customers at each display shelf and the state of staying of customers around each display shelf.

It is to be noted that in the present embodiment, the result of totaling (number of item pick-up actions and staying time) is displayed for each display shelf, but the display may be modified such that each display shelf displayed is divided into multiple shelf boards. Further, though the staying time and number of item pick-up actions are displayed simultaneously in the analysis result screen shown in FIG. 6, the staying time and number of item pick-up actions may be displayed separately.

Figure 7:
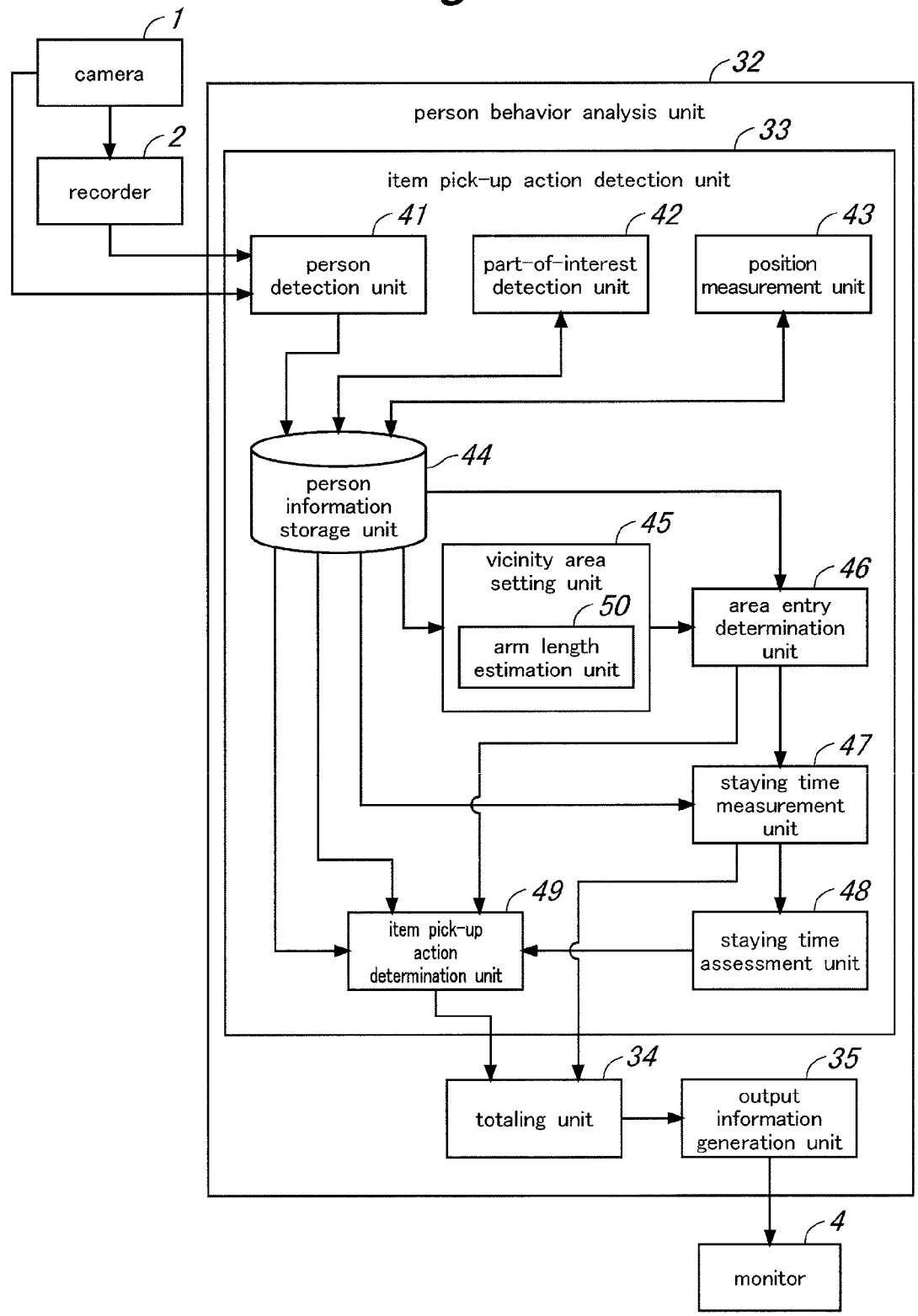
FIG. 7 is a block diagram schematically showing a structure of an item pick-up action detection unit 33.

Next, a description will be given of the item pick-up action detection unit 33 shown in FIG. 4. FIG. 7 is a block diagram schematically showing a structure of the item pick-up action detection unit 33.

The item pick-up action detection unit 33 detects an item pick-up action by determining whether a person present in an area around a display shelf performed an item pick-up action of picking up an item placed on the display shelf, and includes a person detection unit 41, a part-of-interest detection unit 42, a position measurement unit 43, a person information storage unit 44, a vicinity area setting unit 45, an area entry determination unit 46, a staying time measurement unit 47, a staying time assessment unit 48, and an item pick-up action determination unit 49. In the following, each unit of the item pick-up action detection unit 33 will be described.

Figure 8A:
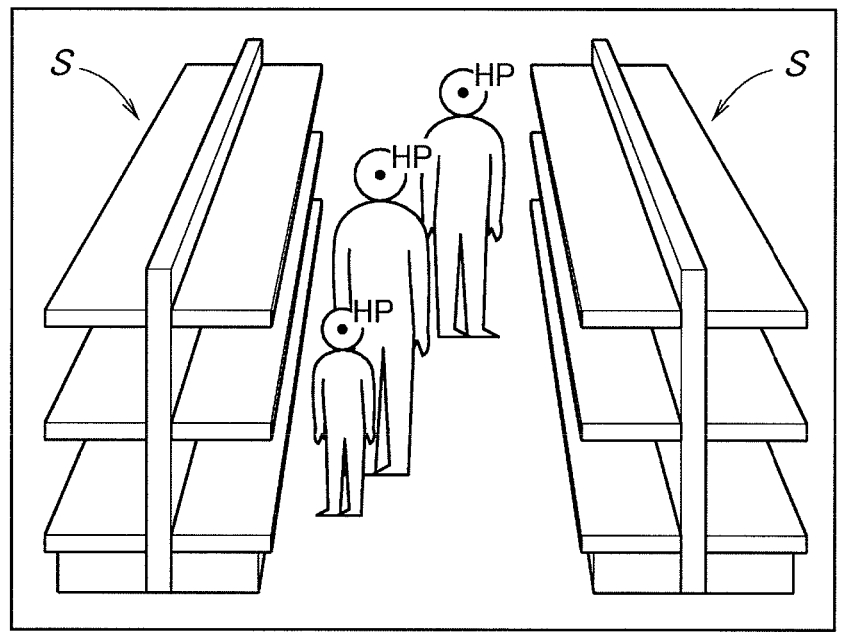
FIGS. 8A and 8B are explanatory diagrams for explaining processes performed by a person detection unit 41, a part-of-interest detection unit 42 and a position measurement unit 43.
Figure 8B:
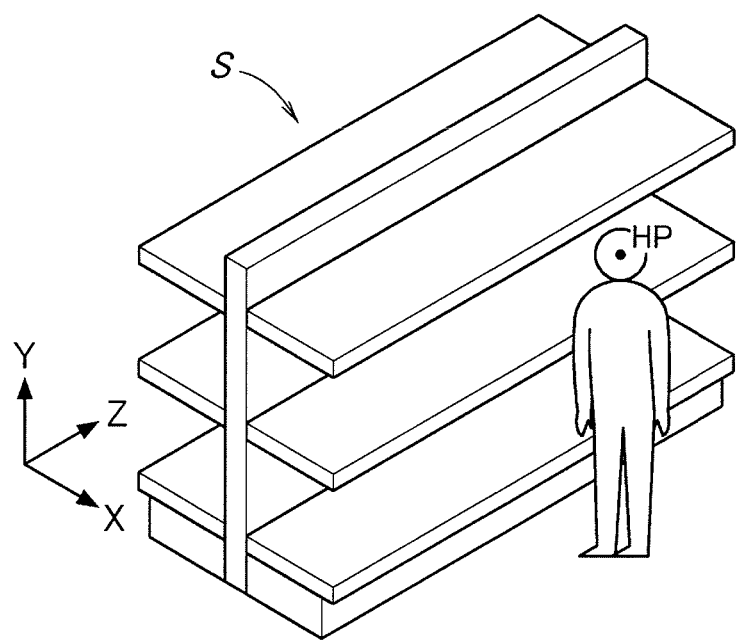

First, a description will be given of the person detection unit 41, part-of-interest detection unit 42 and position measurement unit 43 shown in FIG. 7. FIGS. 8A and 8B are explanatory diagrams for explaining processes performed by the person detection unit 41, part-of-interest detection unit 42 and position measurement unit 43. FIG. 8A shows a captured image taken by a camera 1 covering an area around a display shelf, while FIG. 8B shows an absolute coordinate system used by the position measurement unit 43.

The person detection unit 41 performs a process of detecting a person(s) from image information (moving picture constituted of multiple frames (captured images)) obtained by capturing images covering an area around display shelves S as shown in FIG. 8A. In the person detection process, known image recognition technology (person detection technology) may be used. For example, template matching may be used in which templates of persons in various postures are used to detect an image region(s) corresponding to a person(s) from the captured images. Alternatively or in addition, it is possible to detect a moving body(s) based on background difference (difference between each captured image and a background image taken when there is no person) and determine whether the moving body is a person based on the features of the moving body.

It is to be noted that in the present embodiment, only the head of each detected person is to be observed as described in the following, and thus, it is not necessary to detect the image region of the entire body of the person and it is sufficient if an image region that is recognized as a part of the body including a head can be detected.

The part-of-interest detection unit 42 performs a process of detecting, for each person detected by the person detection unit 41, a part of interest set in a part of an upper body of each person excluding the hands and arms. Particularly, in the present embodiment, the part of interest is the head of each person, and a process of detecting the head of each person from captured images is performed. In the head detection process, known image recognition technology (head detection technology) may be used. For example, it is possible to use template matching in which templates of an elliptical shape or the like are used to detect an image region corresponding to the head from the image region of each person detected by the person detection unit 41. Also, if a histogram is formed by projecting an image of a person in a horizontal direction, the histogram will exhibit a mound shape in a region corresponding to the part from the top of the head to the base of the neck of the person, and thus, the histogram may be used to detect the head of the person.

The position measurement unit 43 performs a process of measuring the position of each head detected. Particularly, in the present embodiment, the position of a central point of each head (hereinafter, head center HP) is measured. The head center HP may be determined by any appropriate method. For example, in the head detection method using template matching, the center of an image area matching a template of an elliptical shape or the like may be determined to be the head center HP, while in the head detection method using a histogram, the peak of the mound-shaped histogram may be used to determine the head center HP.

In the position detection process, the coordinate of the head center HP of each head on the captured image is obtained, as shown in FIG. 8A, and then, coordinate transformation is performed to transform the obtained coordinate on the captured image to a coordinate in an absolute coordinate system in which an XZ plane corresponds to the floor surface, as shown in FIG. 8B. In the illustrated example, the X axis direction corresponds to a horizontal direction toward the display shelf S, the Y axis direction corresponds to the direction of height, and the Z axis direction corresponds to a horizontal direction along the display shelf S.

As described in the foregoing, in the present embodiment, a person's head is detected as the part of interest, and since the head can be detected easily, it is possible to obtain a displacement of the part of interest with high accuracy. Further, in the present embodiment, the position of the head center is measured. Since the head center can be detected highly accurately from the result of detection of the head, the displacement of the part of interest can be obtained even more accurately.

It is to be noted that the person detection unit 41 performs the person detection process for each frame (captured image) contained in the moving picture obtained from the recorder 2, and if a person is detected from a frame, the timestamp (time of image capture) of the frame is stored in the person information storage unit 44 as the time of detection of the person together with a person ID. Further, the position of the head center obtained by the position measurement unit 43 is stored in the person information storage unit 44 in association with the time of detection. It is to be noted here that in the person detection process, it is not necessarily required to use the moving picture frames via the recorder 2, and it is also possible to perform the person detection process using the moving picture frames input in real time from the cameras 1.

Figure 9A:
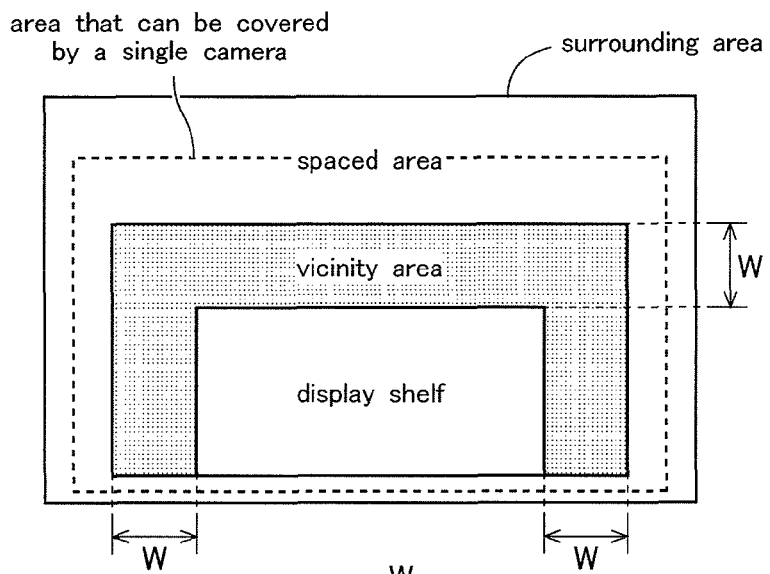
FIGS. 9A to 9D are explanatory diagrams for explaining a vicinity area set by a vicinity area setting unit 45.
Figure 9B:
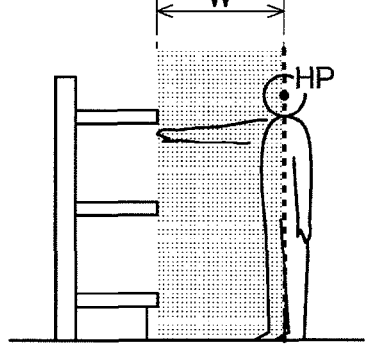
Figure 9C:
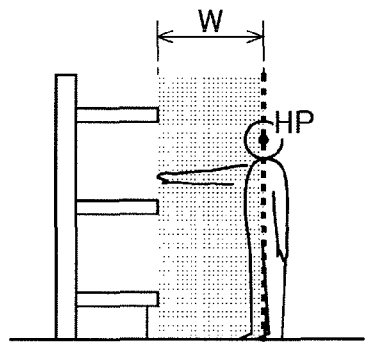
Figure 9D:
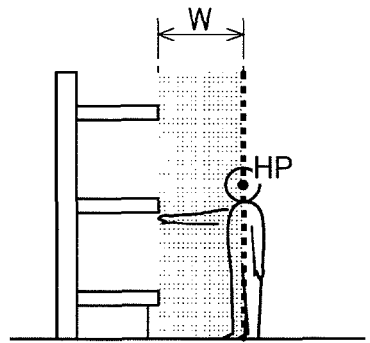

Next, a description will be given of the vicinity area setting unit 45 shown in FIG. 7. FIGS. 9A-9D are explanatory diagrams for explaining a vicinity area set by the vicinity area setting unit 45. FIG. 9A is a plan view and FIGS. 9B, 9C and 9D are side views with a person of different height.

In the present embodiment, the vicinity area setting unit 45 shown in FIG. 7 sets a vicinity area around a display shelf as shown in FIG. 9A.

The vicinity area is the maximum area in which a person can pick up an item placed on the display shelf, namely, the maximum area in which a person can touch an item on the display shelf by extending an arm, and is set to extend over a width W from an outer edge of the display shelf. Specifically, in the example shown in FIG. 9A, a person can touch items on the display shelf from the front, left and right sides of the display shelf, the vicinity area is set to have a shape of letter U to oppose the front, left and right sides of the display shelf.

In addition, in the present embodiment, a surrounding area and a spaced area are set around a display shelf, as shown in FIG. 9A.

The surrounding area defines a selling area for the items placed on the display shelf, and is set to have such a size that a person in the surrounding area can identify the items on the display shelf, for example. The surrounding area is preset to have an appropriate size around the display shelf depending on the circumstances around the display shelf. It is to be noted that in the example shown in FIG. 9A, the surrounding area is defined to have a size larger than that of an area that can be covered by a single camera 1, but this may not be the case depending on the arrangement of the display shelves and the cameras.

The spaced area is an area in which a person cannot pick up an item placed on the display shelf, namely, an area in which a person cannot touch an item on the display shelf by extending his/her arm. The spaced area is an area obtained by removing the vicinity area from the surrounding area.

Further, in the present embodiment, as shown in FIG. 7, the vicinity area setting unit 45 includes an arm length estimation unit 50 that estimates an arm length of a person, such that the vicinity area setting unit 45 sets the vicinity area based on the arm length obtained by the arm length estimation unit 50.

As mentioned in the foregoing, the vicinity area is the maximum area in which a person can touch an item on the display shelf by extending an arm, and can vary depending on the arm length of the person. Thus, the vicinity area setting unit 45 sets the vicinity area for each person. Namely, as shown in FIGS. 9B, 9C and 9D, the width W of the vicinity area is set based on the arm length of each person. Since the arm length of a person is proportional to the height of the person, when there are multiple persons in front of the display shelf, vicinity areas having different sizes are set for respective persons.

The arm length estimation unit 50 shown in FIG. 7 performs a process of estimating an arm length from the result of measurement by the position measurement unit 43, more specifically, from the Y coordinate value of the head center which corresponds to the height of the person, in accordance with the correlation between height and arm length. Since the arm length of a person is proportional to the height of the person, it is possible to estimate the arm length from the height. Specifically, the arm length can be obtained by multiplying the height by a predetermined coefficient (for example, 0.44).

FIG. 10 is an explanatory diagram showing an arm length estimation table used by the arm length estimation unit 50 shown in FIG. 7. The arm length estimation unit 50 estimates the arm length from the Y coordinate value of the head center by use of the arm length estimation table preset based on the correlation between height and arm length. In the arm length estimation table, the Y coordinate value of the head center is divided into three ranges, and an arm length is set for each range.

The Y coordinate value of the head center is a height of the head center from the floor surface, and varies depending on the posture of the person. On the other hand, in estimating the arm length, it is desirable to obtain the height of the head center in an upright posture (a posture in which the person stands upright), but the height of the head center while the person is walking does not significantly differ from that when the person is in the upright posture. Thus, it is preferred to obtain the Y coordinate value of the head center of the person when the person has entered the surrounding area but is still walking, and to estimate the arm length from the obtained Y coordinate value of the head center and set the vicinity area by use of the estimated arm length.

As described above, in the present embodiment, the vicinity area is set based on the arm length estimated from the height of a person according to the correlation between height and arm length, and thus, the vicinity area can be set easily and with high precision.

It is to be noted that though the arm length estimation table shown in FIG. 10 does not show concrete values of the Y coordinate value of the head center, the Y coordinate value of the head center is equal to the height of the person minus the length from the head center to the head top.

Also, though the arm length estimation table shown in FIG. 10 sets forth the relationship between the Y coordinate value of the head center and the height and arm length, it is also possible to obtain the arm length directly from the Y coordinate value of the head center without obtaining the height from the Y coordinate value of the head center.

Next, a description will be given of the area entry determination unit 46 shown in FIG. 7. The area entry determination unit 46 performs a process of determining whether each person detected by the person detection unit 41 entered the surrounding area as well as whether the person entered the vicinity area based on the position of the head center of the person obtained by the position measurement unit 43.

The area entry determination is performed based on the planar positional relationship between the person and the display shelf, namely, the position of the head center on the floor surface. Specifically, the coordinate of the head center (X coordinate value and Z coordinate value) is obtained from the position measurement unit 43, and the obtained coordinate is compared with coordinates defining the boundaries of the surrounding area and the vicinity area to determine whether the person entered the surrounding area and whether the person entered the vicinity area. It is to be noted here that the coordinates defining the boundary of the surrounding area are set in advance, while the coordinates defining the vicinity area are obtained from the vicinity area setting unit 45.

Particularly, since the vicinity area is an area in which a person cannot touch an item on the display shelf by extending his/her arm and a person outside the vicinity area cannot perform an item pick-up action of picking up an item placed on the display shelf (item placement area), the area entry determination unit 46 determines that, of the persons detected by the person detection unit 41, a person(s) who did not enter the vicinity area is a person who could not perform an item pick-up action.

Next, a description will be given of the staying time measurement unit 47 shown in FIG. 7. The staying time measurement unit 47 performs a process of measuring the time for which the person who entered the surrounding area stayed in the surrounding area (surrounding area staying time) and the time for which the person who entered the vicinity area stayed in the vicinity area (vicinity area staying time).

In this staying time measurement process, the surrounding area staying time and the vicinity area staying time are calculated from the entry times into the surrounding area and the vicinity area and the exit times from the surrounding area and the vicinity area. The area entry determination unit 46 detects entry of a person into the surrounding area and the vicinity area as well as leaving of the person from the surrounding area and the vicinity area. It is to be noted that the person information storage unit 44 stores the position of the head center of each person detected in each frame (image) in association with the time of detection, and thus, based on the times of detection stored in the person information storage unit 44, it is possible to obtain the times when the a person's entry into and leaving from the above areas were detected by the area entry determination unit 46 (entry time and exit time).

Next, a description will be given of the staying time assessment unit 48 shown in FIG. 7. The staying time assessment unit 48 determines that, of the persons detected by the person detection unit 41, a person(s) whose vicinity area staying time obtained by the staying time measurement unit 47 does not reach a predetermined threshold value (for example, one second) is a person who could not perform an item pick-up action.

Since it requires a certain time to perform an item pick-up action of picking up an item placed on a display shelf, if the threshold value is set to a time required to perform an item pick-up action, it is possible to determine that a person whose vicinity area staying time did not reach the threshold value is a person who could not perform an item pick-up action.

It is to be noted that the time required to perform an item pick-up action may vary depending on such factors as the form of the display shelf and the type of items placed on the display shelf, and the threshold value may be set appropriately taking into account the factors that can affect item pick-up actions.

Next, a description will be given of the item pick-up action determination unit 49 shown in FIG. 7. The item pick-up action determination unit 49 performs a process of obtaining a displacement of the head center of each person from the result of measurement by the position measurement unit 43 and determining whether each person detected by the person detection unit 41 performed an item pick-up action of picking up an item placed on the display shelf based on the displacement of the head center of the person. This item pick-up action determination process performed by the item pick-up action determination unit 49 will be described in detail later.

It is to be noted that at the item pick-up action determination unit 49, of the persons detected by the person detection unit 41, those determined by the area entry determination unit 46 and the staying time assessment unit 48 to be persons who could not perform an item pick-up action of picking up an item placed on the display shelf are excluded from the item pick-up action determination. Therefore, the vicinity area entry determination and the staying time assessment are performed by the area entry determination unit 46 and the staying time assessment unit 48 prior to the item pick-up action determination performed by the item pick-up action determination unit 49.

As described above, in the present embodiment, a vicinity area, which is the maximum area in which a person can touch an item by extending his/her arm, is set, and thus, a person who did not enter the vicinity area can be determined to be a person who could not perform an item pick-up action because such a person could not touch an item even if the person extended his/her arm. The persons determined in the area entry determination to be persons who could not perform an item pick-up action are excluded from the determination performed by the item pick-up action determination unit 49, and thus, persons to be included in the determination performed by the item pick-up action determination unit 49 can be narrowed down. Further, the area entry determination is performed based on the planar positional relationship and thus can be carried out easily, contributing to increase in the overall processing speed as well as improvement in the accuracy of the item pick-up action determination.

Further, in the present embodiment, a staying time in the vicinity area is measured, and a person whose staying time does not reach a predetermined threshold value can be determined to be a person who could not perform an item pick-up action. The persons determined in the staying time assessment to be persons who could not perform an item pick-up action are excluded from the determination performed by the item pick-up action determination unit 49, and thus, persons to be included in the determination performed by the item pick-up action determination unit 49 can be narrowed down. Further, the staying time measurement can be done easily based on the entry time into the vicinity area and the exit time from the vicinity area and the staying time assessment can be carried out by simple comparison of numerical values, and this contributes to increase in the overall processing speed as well as improvement in the accuracy of the item pick-up action determination.

Next, a description will be given of the process performed by the item pick-up action determination unit 49 shown in FIG. 7. FIGS. 11A, 11B and FIGS. 12A and 12B are explanatory diagrams for explaining the process performed by the item pick-up action determination unit 49.

The item pick-up action determination unit 49 performs a process of obtaining a displacement of the head center HP of each person from the position of the head center HP obtained by the position measurement unit 43 and determining whether the person performed an item pick-up action of picking up an item placed on the display shelf S based on the displacement of the head center HP. Particularly, in the present embodiment, it is determined whether the person performed an item pick-up action based on the displacement of the head center HP obtained relative to the position of the head center HP when the person entered the vicinity area in an upright posture.

A person who may perform an item pick-up action of picking up an item placed on the display shelf S, namely, a person who is interested in the items on the display shelf S will pause in front of the display shelf S, and in such a state, the person is in an upright posture. Thus, the position of the head center HP in the stationary state can be used as a reference position. Alternatively, since the height of the head center while the person is walking does not significantly differ from that when the person is in an upright posture, it is also possible to use the position of the head center HP immediately after the person has entered the vicinity area as a reference position.

Particularly, in the present embodiment, the display shelf S includes multiple vertically spaced shelf boards (in this example, upper, middle and lower shelf boards SB1 to SB3) on which items are placed, and it is possible to determine which of the shelf boards SB1 to SB3 an item pick-up action was performed to pick up an item from. In the following, an explanation will be given of how this is achieved.

Figure 11A:
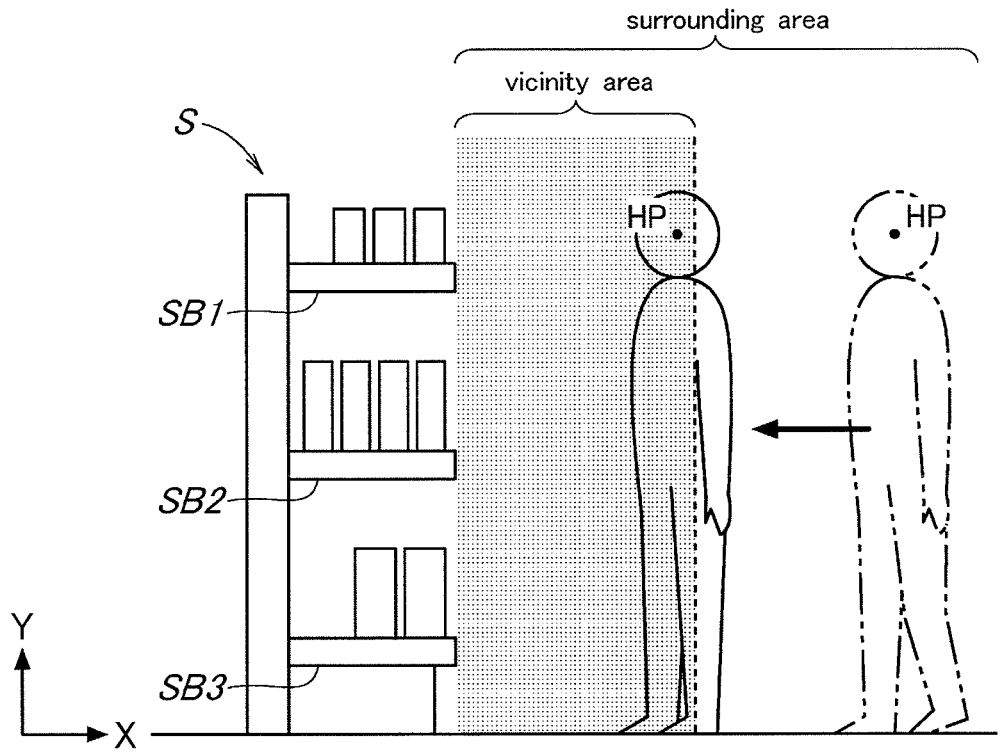
FIGS. 11A and 11B are explanatory diagrams for explaining a process performed by an item pick-up action determination unit 49.

FIG. 11A shows a state in which a person is standing in front of the display shelf S after walking toward the display shelf S. In this case, when the person has entered the surrounding area, the vicinity area is set based on the height of the head center HP of the person (Y coordinate value), and when the person stopped to pause in front of the display shelf S or when the person has entered the vicinity area, the item pick-up action determination is initiated using the position of the head center HP of the person at that time as a reference position.

Figure 11B:
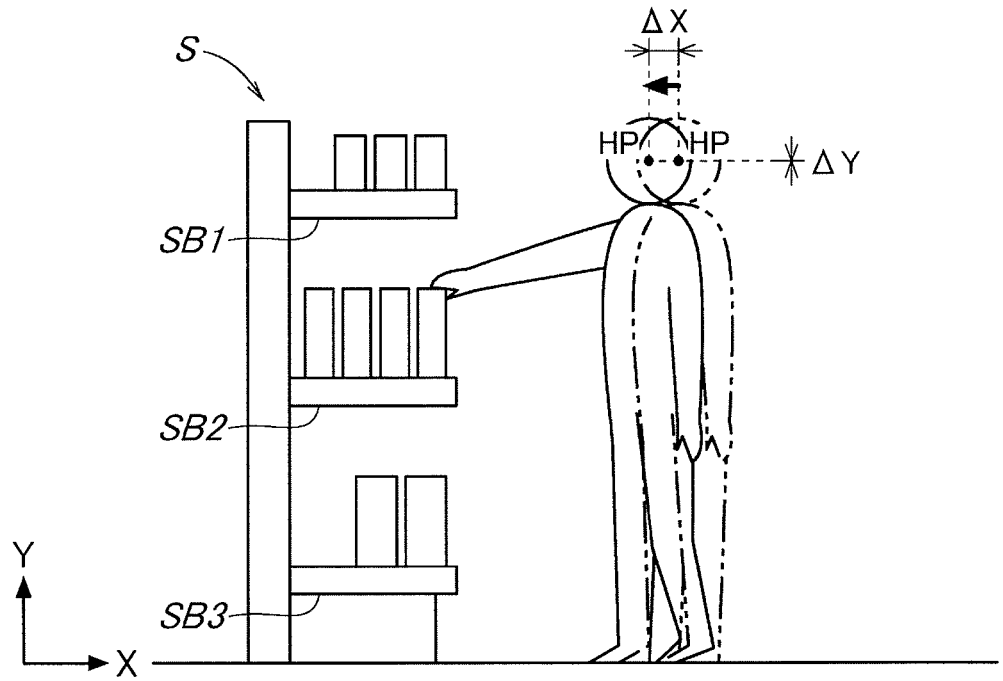

FIG. 11B shows a case where the person picks up an item placed on the middle shelf board SB2 of the display shelf S. In this case, the person may move closer to the display shelf S to pick up an item or remain standing in front of the display shelf S as shown in FIG. 11A, and in any case, the posture does not change significantly from the upright posture, and hence, there is no displacement of the head center HP in the vertical direction (Y axis direction). Therefore, when there is no displacement of the head center HP in the vertical direction, it can be determined that there was an item pick-up action in order to pick up an item placed on the middle shelf board SB2.

Figure 12A:
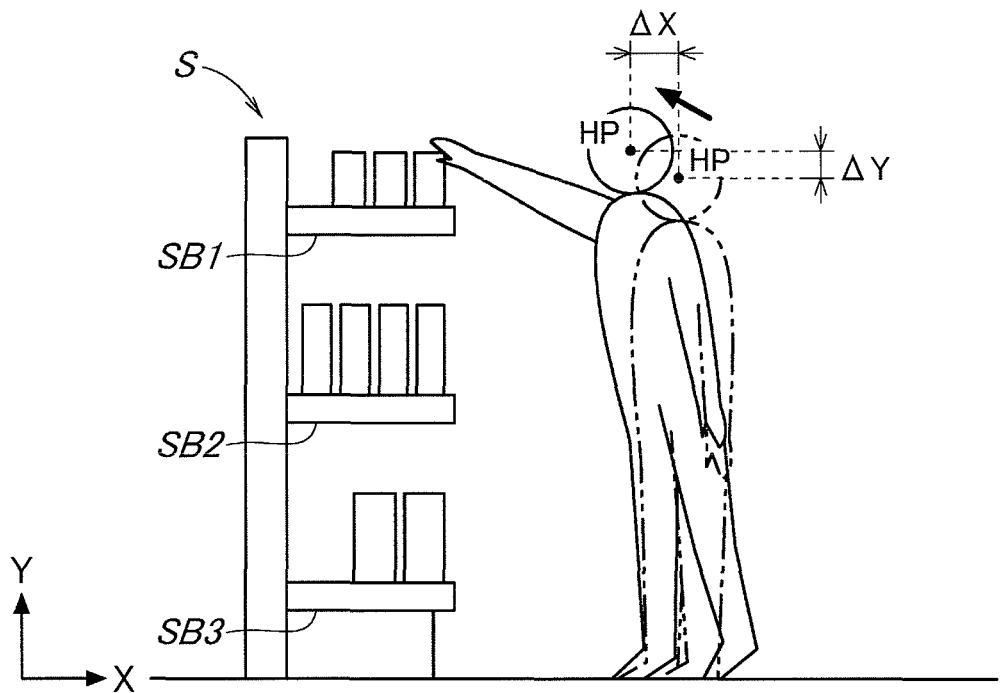
FIGS. 12A and 12B are explanatory diagrams for explaining a process performed by the item pick-up action determination unit 49.

FIG. 12A shows a case where the person picks up an item placed on the upper shelf board SB1 of the display shelf S. In this case, the posture of the person changes from the upright posture to a posture in which the person stands on tiptoe and leans forward along with the motion of extending the hand toward an item on the upper shelf board SB1, and in accordance with the change in the posture, the head center HP is displaced in an oblique upward direction. Therefore, when there is a displacement of the head center HP in an oblique upward direction, it can be determined that there was an item pick-up action in order to pick up an item placed on the upper shelf board SB1.

Figure 12B:
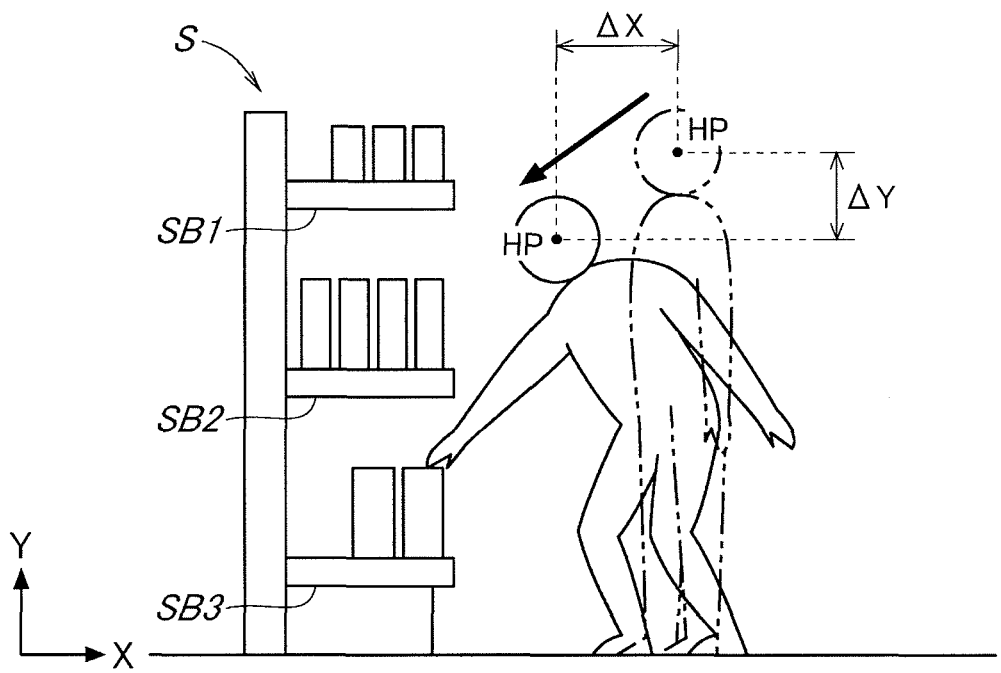

FIG. 12B shows a case where the person picks up an item placed on the lower shelf board SB3 of the display shelf S. In this case, the posture of the person changes from the upright posture to a stooping posture along with a motion of extending the hand toward an item on the lower shelf board SB3, and in accordance with the change in the posture, the head center HP is displaced in an oblique downward direction. Therefore, when there is a displacement of the head center HP in an oblique downward direction, it can be determined that there was an item pick-up action in order to pick up an item placed on the lower shelf board SB3.

Specifically, the item pick-up action determination may be performed based on a displacement quantity $\Delta X$ in the horizontal direction and a displacement quantity $\Delta Y$ in the vertical direction relative to the reference position. For example, as shown in FIG. 12A, in the case where the person picks up an item on the upper shelf board SB1, the displacement quantity $\Delta X$ in the horizontal direction has a negative value and the displacement quantity $\Delta Y$ in the vertical direction has a positive value, while, as shown in FIG. 12B, in the case where the person picks up an item on the lower shelf board SB3, the displacement quantity $\Delta X$ in the horizontal direction and the displacement quantity $\Delta Y$ in the vertical direction are both negative values, and thus, by determining the direction of displacement of the head center HP based on whether the displacement quantities $\Delta X$, $\Delta Y$ are positive or negative, it is possible to determine which of the upper shelf board SB1 and the lower shelf board SB3 an item pick-up action was performed to pick up an item from. In order to avoid erroneous determination caused by a slight change in the posture of the person, it is preferred to compare the displacement quantities $\Delta X$, $\Delta Y$ with respective predetermined threshold values, and determine that the person performed an item pick-up action when the displacement quantities $\Delta X$, $\Delta Y$ reach the respective threshold values.

Instead of performing a determination by comparing the displacement quantities $\Delta X$, $\Delta Y$ with the respective threshold values, it is also possible to perform a determination based on a displacement pattern of the head center HP. Specifically, by obtaining beforehand a displacement pattern of the head center HP for each of the cases where an item pick-up action is performed to pick up an item placed on the upper shelf board SB1, where an item pick-up action is performed to pick up an item placed on the middle shelf board SB2 and where an item pick-up action is performed to pick up an item placed on the lower shelf board SB3, and comparing an actual path of movement of the head center HP with these displacement patterns, it is possible to determine which of the upper, middle and lower shelf boards SB1 to SB3 the item pick-up action was performed to pick an item from.

As described above, when a person performs an item pick-up action of picking up an item placed on a display shelf, the posture of the person changes, particularly an upper body of the person moves, along with a motion of extending the hand toward an item on the display shelf. In the present embodiment, a displacement of a part of interest set in a part of an upper body of a person excluding the hands and arms, preferably a displacement of the head, is observed, whereby it is possible to determine whether the person performed an item pick-up action even when neither the movement of the hand nor the movement of the arm of the person can be detected. This makes it possible to perform person behavior analysis on item pick-up actions with high accuracy. Further, since the person behavior analysis can be performed using conventional monitoring cameras without use of a camera specifically provided for person behavior analysis, the installation cost can be reduced.

Figure 13A:
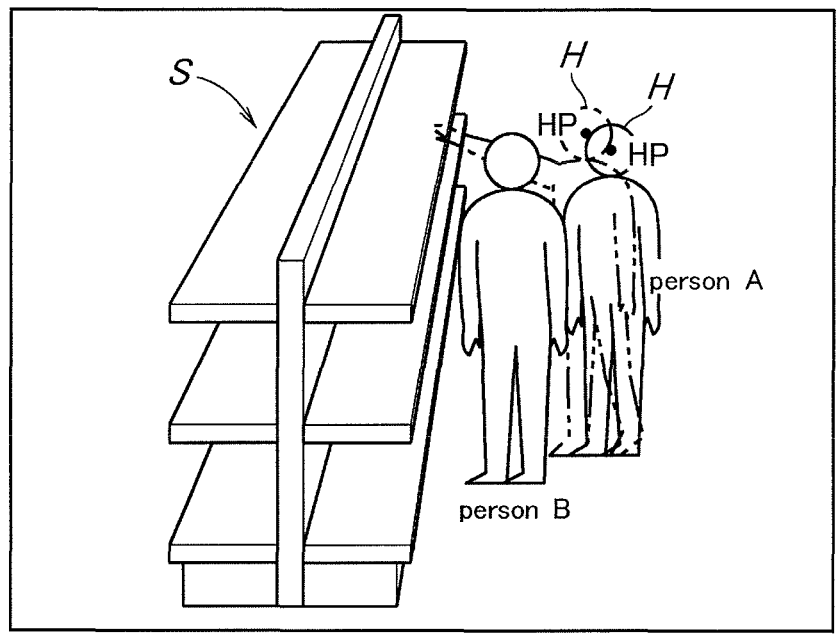
FIGS. 13A and 13B are explanatory diagrams each showing an example of a captured image taken while a person is performing an item pick-up action.
Figure 13B:
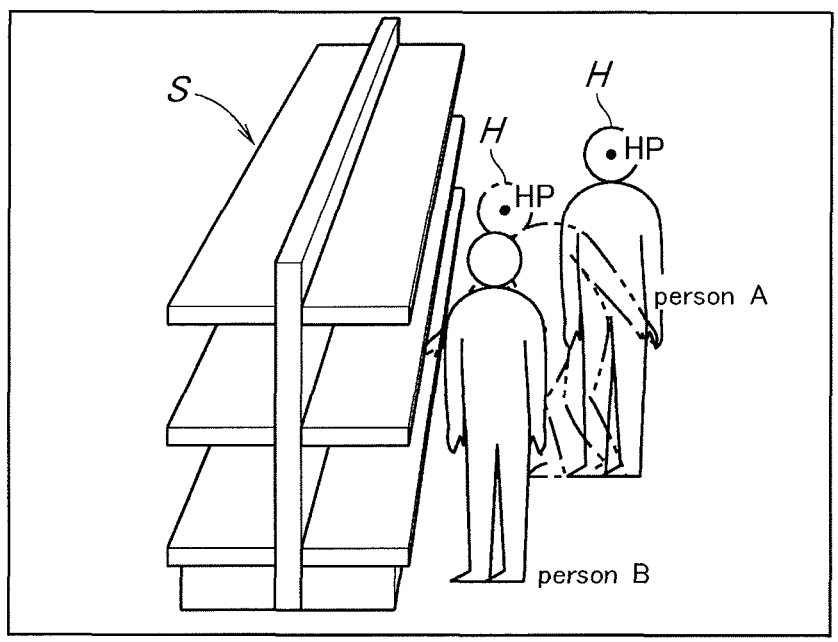

FIGS. 13A and 13B are explanatory diagrams each showing an example of a captured image taken while a person is performing an item pick-up action. These captured images are taken by a camera 1 to capture an image of an area around a display shelf S from a side thereof. In the illustrated example, there are two persons A and B standing in front of the display shelf S. In such a circumstance, if the person A performs an item pick-up action to pick up an item placed on the display shelf S, neither the movement of the hand nor the movement of the arm of person A can be seen in the captured images because they are hidden by the body of the adjacent person B, and thus, neither the movement of the hand nor the movement of the arm of the person A can be detected. On the other hand, the head H of the person A performing an item pick-up action appears in the captured image, and the head H moves along with a motion of extending the hand toward an item placed on the display shelf S, and thus, it is possible to determine whether an item pick-up action was performed based on the displacement of the head H.

Further, in the present embodiment, since the determination of whether an item pick-up action item was performed is made based on the fact that the posture of a person changes along with a motion of extending the hand toward an item to pick it up, and thus, when the display shelf has multiple vertically spaced shelf boards on which items are placed, it is possible to determine with high accuracy which of the multiple shelf boards an item pick-up action was performed to pick up an item from. As such display shelves are commonly used in retail stores, the above feature of the present invention allows the person behavior analysis in retail stores to be performed in detail with high accuracy.

Further, in the present embodiment, the determination of whether an item pick-up action item was performed is performed based on a displacement of the head center with respect to the position of the head center when a person entered the vicinity area in an upright posture, and thus, the item pick-up action determination can be performed easily with high accuracy.

Yet further, in the present embodiment, in a situation where there are multiple persons around a display shelf simultaneously, the person detection unit 41 shown in FIG. 7 detects the multiple persons simultaneously present around the display shelf, the part-of-interest detection unit 42 detects the head of each person detected by the person detection unit 41, the position measurement unit 43 measures the position of each person's head center detected by the part-of-interest detection unit 42, and the item pick-up action determination unit 49 determines whether each person detected by the person detection unit 41 performed an item pick-up action.

Thereby, even in a situation where there are multiple persons around a display shelf simultaneously, it is possible to determine whether each person performed an item pick-up action. In the situation where there are multiple persons around a display shelf simultaneously, the arm and hand of a person performing an item pick-up action may be hidden from view by another person so that neither the movement of the hand nor the movement of the arm of the person performing an item pick-up action can be detected. However, in the present embodiment, since a displacement of a part of interest set in a part of an upper body of each person excluding the hands and arms, preferably a displacement of the head, is observed, it is possible to determine with high accuracy whether each person performed an item pick-up action.

Figure 14:
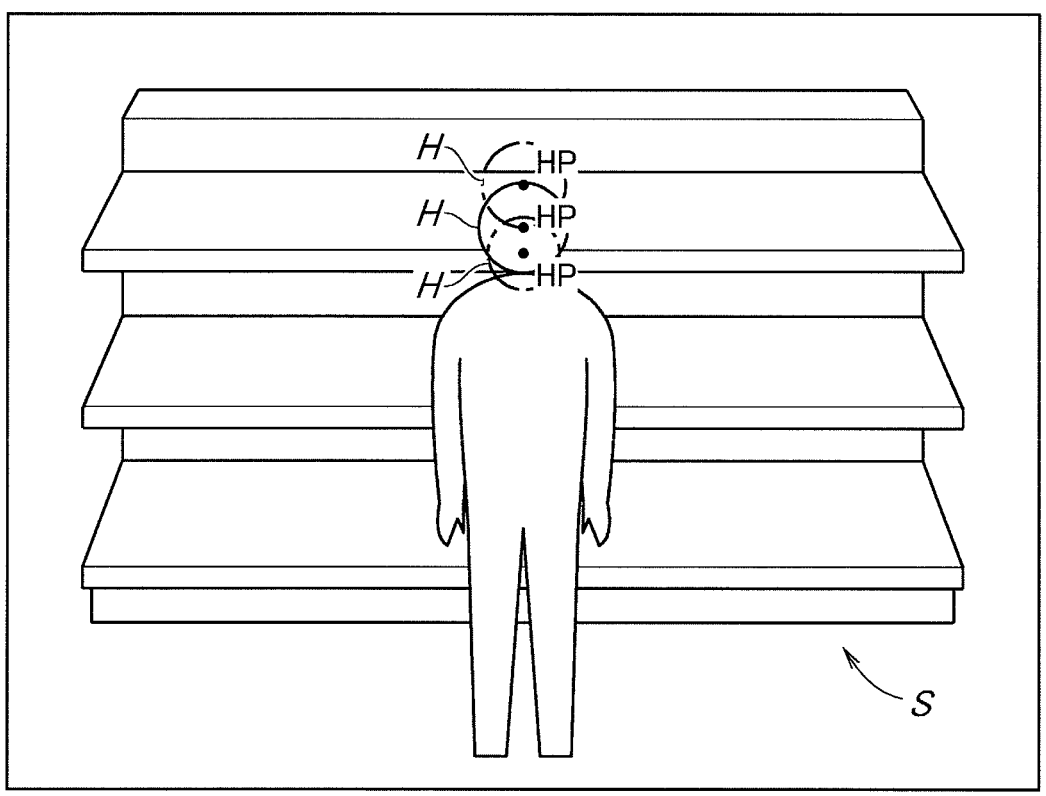
FIG. 14 is an explanatory diagram showing a captured image in which a person facing a display shelf is viewed from a rear side.
Figure 15:
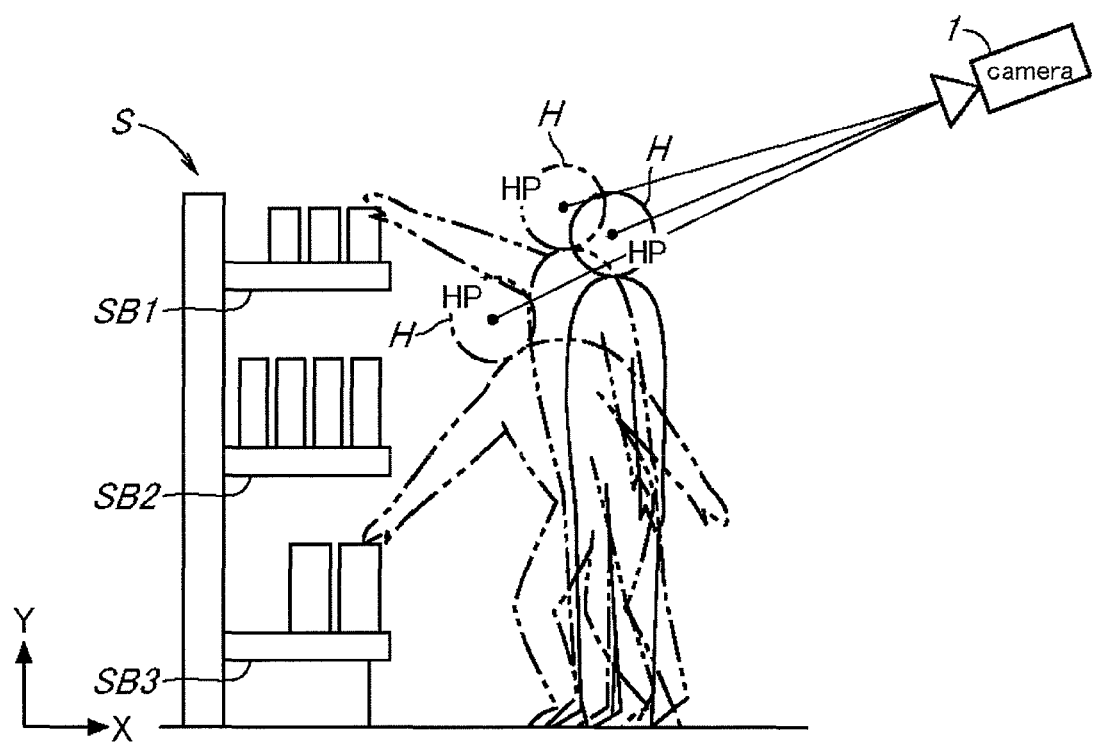
FIG. 15 is a side view showing an imaging situation of the captured image shown in FIG. 14.

Next, a description will be given of a process of measuring the position of the part of interest based on an apparent size of the part of interest, which is performed by the position measurement unit 43 shown in FIG. 7. FIG. 14 is an explanatory diagram showing a captured image in which a person facing a display shelf is viewed from a rear side. FIG. 15 is a side view showing an imaging situation of the captured image shown in FIG. 14.

As shown in FIG. 14, in a case where a camera 1 is set up to capture an image of an area around a display shelf S from the front of the display shelf S, a person who is going to perform an item pick-up action to pick up an item placed on the display shelf S faces the display shelf S, and thus, the rear side of the person appears in the captured image. Therefore, if the person performs an item pick-up action, neither the movement of the hand nor the movement of the arm can be seen in the captured image as they are hidden from view by the body of the person. On the other hand, the head H of the person appears in the captured image, and the head H moves along the a motion of extending the hand toward an item placed on the display shelf S, and thus, it is possible to determine whether an item pick-up action was performed based on the displacement of the head H.

It is to be noted here that, as shown in FIGS. 11A, 11B and FIGS. 12A, 12B, the determination of whether a person performed an item pick-up action is performed based on the displacement of the head center HP in the horizontal direction (X axis direction) and vertical direction (Y axis direction) in the absolute coordinate system. However, in the situation as shown in FIG. 15, it may not be possible to detect the displacement of the head center HP in the direction of depth as viewed from the camera 1 by observing the position of the head center HP on the captured images, and thus, it is difficult to perform coordinate transformation to transform a position in the image coordinate system to a position in the absolute coordinate system, whereby the displacement of the head center HP in the absolute coordinate system may not be known.

To address such a problem, in the present embodiment, the position measurement unit 43 obtains information indicating the apparent size of the head H from the captured images, and based on a change in the apparent size of the head H, measures the position of the head H in the direction of depth.

The apparent size of the head H appearing in the captured images varies as the distance from the camera 1 to the head H changes. For example, when the posture of the person changes from the upright posture to a posture in which the person stands on tiptoe and leans forward to pick up an item placed on the upper shelf board SB1 of the display shelf S, or to a stooping posture to pick up an item placed on the lower shelf board SB3 of the display shelf S, the head H moves away from the camera 1 as compared to when the person is in the upright posture, and thus, the apparent size of the head H becomes smaller. Therefore, it is possible to obtain a displacement in the absolute coordinate system from an amount of change in the apparent size of the head H in the captured images and an amount of displacement of the head center HP in the image coordinate system.

Thus, in the present embodiment, since the displacement of the head H in the direction of depth as seen from the camera 1 is obtained based on the change in the apparent size of the head H, it is possible to obtain an actual displacement of the head H with high accuracy.

Second Embodiment

Next, a description will be given of an item pick-up action determination according to the second embodiment. FIGS. 16A, 16B and FIGS. 17A, 17B are explanatory diagrams for explaining an item pick-up action determination according to the second embodiment. The second embodiment is the same as the foregoing embodiment except for the points mentioned in the following description, and an item pick-up action determination described below is performed by the item pick-up action determination unit 49 shown in FIG. 7.

In the second embodiment, it is determined whether a person performed an item pick-up action of picking up an item placed on a display shelf S based on the positional relationship between a reference position(s) set in the display shelf S and the head center HP of the person.

Specifically, in the present embodiment, reference positions are defined as front end positions (more specifically, upper front end positions) AP1 to AP3 of items respectively placed on the shelf boards SB1 to SB3 of the display shelf S, and the item pick-up action determination is performed based on the positional relationship between each of the front end positions AP1 to AP3 of the items respectively placed on the shelf boards SB1 to SB3 and the head center HP. It is to be noted that the front end positions AP1 to AP3 of the items are set based on front end positions (more specifically, upper front end positions) SP1 to SP3 of the shelf boards SB1 to SB3 and the size (dimensions) of each item.

In the item pick-up action determination, distances D1 to D3 from front end positions AP1 to AP3 of items respectively placed on the shelf boards SB1 to SB3 to the head center HP of the person are calculated, and when any one of the distances D1 to D3 becomes equal to or smaller than a predetermined threshold value, it is determined that an item pick-up action of picking up an item was performed. The threshold value is set depending on the arm length of each person detected.

Figure 16A:
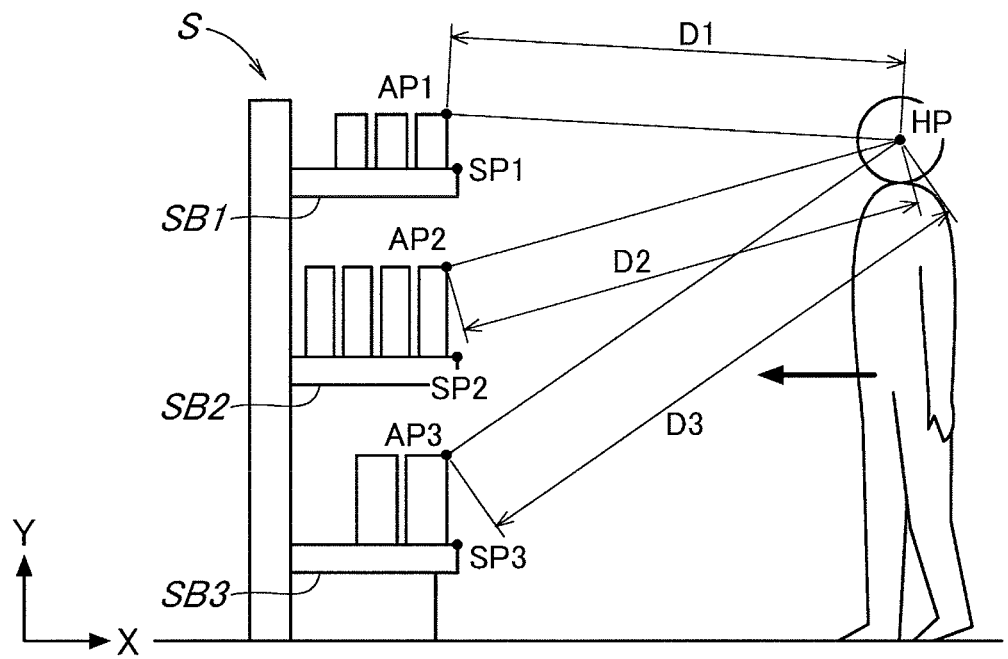
FIGS. 16A and 16B are explanatory diagrams for explaining an item pick-up action determination according to the second embodiment.

FIG. 16A shows a state in which a person is walking toward the display shelf S. In this case, the person is distant from the display shelf S, and the distances D1 to D3 all exceed the threshold value, and thus, it can be determined that no item pick-up action to pick up an item from any of the upper, middle and lower shelf boards SB1, SB2 and SB3 is performed.

Figure 16B:
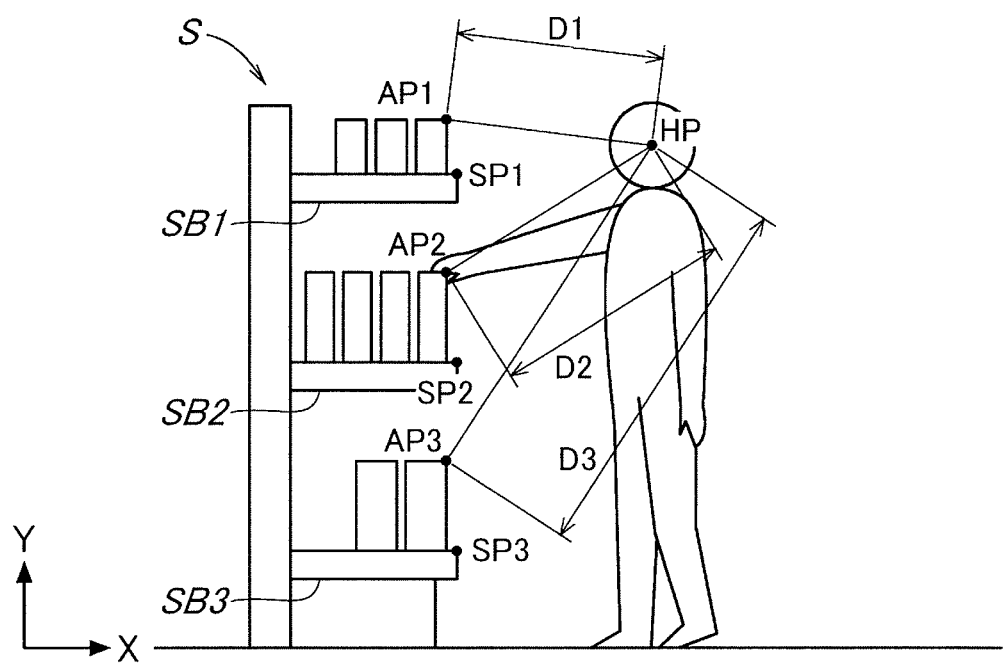

FIG. 16B shows a case where a person picks up an item placed on the middle shelf board SB2 of the display shelf S. In this case, the distance D3 exceeds the threshold value, and therefore, it can be determined that an item pick-up action to pick up an item from the lower shelf board SB3 is not performed. On the other hand, the distances D1 and D2 are both equal to or smaller than the threshold value, and thus, an item pick-up action to pick up an item placed on either one of the upper and middle shelf boards SB1, SB2 is considered possible, but by taking into account the positional relationship in the direction of height between the front end position AP1 of the item on the upper shelf board SP1 and the head center HP of the person, it can be determined that an item pick-up action was not performed to pick up an item placed on the upper shelf board SB1 but to pick up an item placed on the middle shelf board SB2.

Figure 17A:
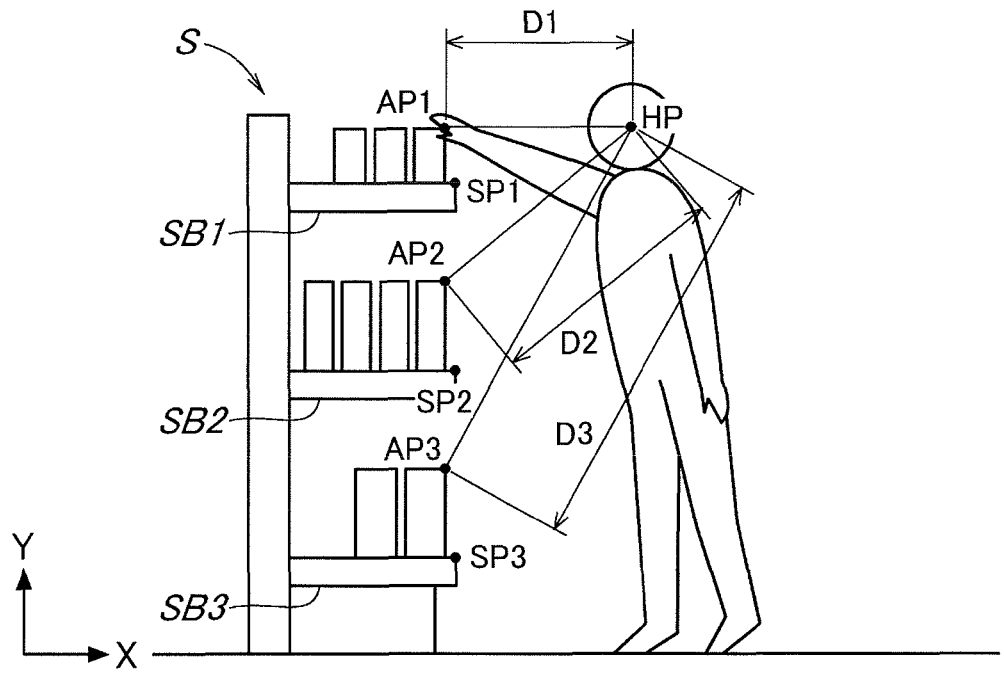
FIGS. 17A and 17B are explanatory diagrams for explaining an item pick-up action determination according to the second embodiment.

FIG. 17A shows a case where a person picks up an item placed on the upper shelf board SB1 of the display shelf S. In this case, the distance D3 exceeds the threshold value, and therefore, it can be determined that an item pick-up action to pick up an item placed on the lower shelf board SB3 is not performed. On the other hand, the distances D1 and D2 are both equal to or smaller than the threshold value, and thus, an item pick-up action to pick up an item placed on either of the upper and middle shelf boards SB1, SB2 is considered possible, but by taking into account the positional relationship in the direction of height between the front end position AP1 of the item on the upper shelf board SP1 and the head center HP of the person, it can be determined that an item pick-up action to pick up an item placed on the upper shelf board SB1 was performed.

Figure 17B:
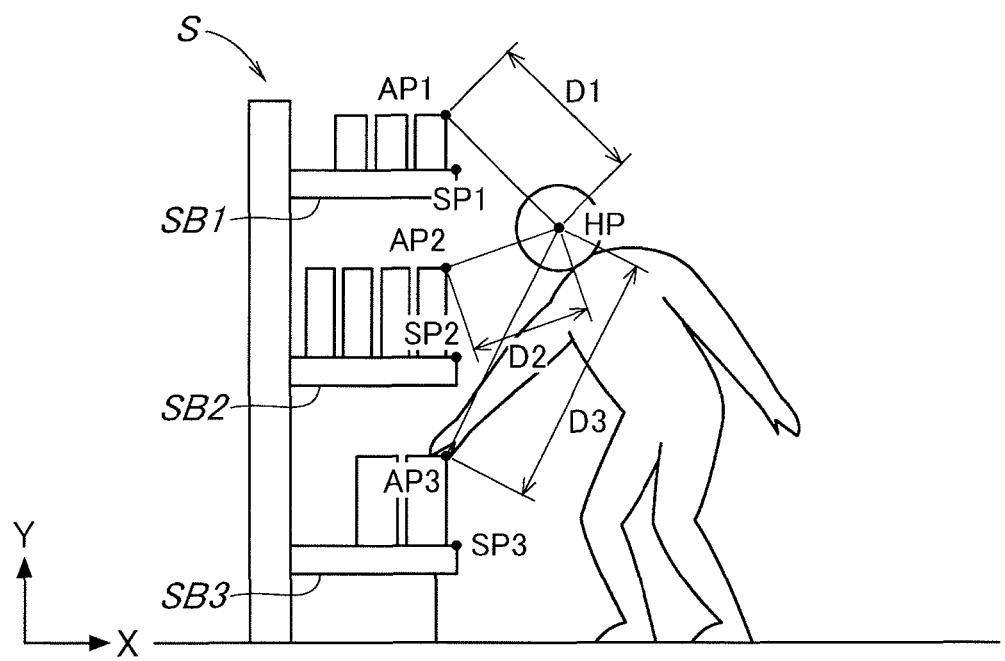

FIG. 17B shows a case where a person picks up an item placed on the lower shelf board SB3 of the display shelf S. In this case, the distances D1 to D3 are all equal to or smaller than the threshold value, and thus, an item pick-up action to pick up an item placed on any one of the upper, middle and lower shelf boards SB1, SB2 and SB3 is considered possible, but by making the determination with priority given to the condition that the distance D3 becomes equal to or smaller than the threshold value, it can be determined that an item pick-up action to pick up an item from the lower shelf board SB3 was performed.

In the present embodiment, it is possible to set a vicinity area as in the first embodiment and perform the item pick-up action determination for each person who entered the vicinity area. However, it is also possible not to set the vicinity area; namely, it is possible to perform the item pick-up action determination based only on the positional relationship between each of the reference positions on the display shelf S and the head center HP of the person, without performing the vicinity area entry determination and the vicinity area staying time assessment.

Further, in the present embodiment, the reference positions are defined as the front end positions AP1 to AP3 of the items respectively placed on the shelf boards SB1 to SB3 of the display shelf S, but it is possible to define the reference positions as the front end positions SP1 to SP3 of the shelf boards SB1 to SB3 and perform the item pick-up action determination based on the positional relationship between each of the front end positions SP1 to SP3 and the head center HP.

As described above, in the present embodiment, the determination of whether an item pick-up action of picking up an item placed on the display shelf S was performed by a person is made based on the positional relationship between each of the reference positions set in the display shelf S and the head center HP of the person, and thus, it is possible to perform the item pick-up action determination easily with high accuracy.

It is to be noted that the item pick-up action determination in the second embodiment explained with reference to FIGS. 16A, 16B and FIGS. 17A, 17B and the item pick-up action determination in the first embodiment explained with reference to FIGS. 11A, 11B and FIGS. 12A, 12B may be combined to perform an item pick-up action determination. In this case, by determining that a person performed an item pick-up action only when the determination condition for the item pick-up action determination in the first embodiment and the determination condition for the item pick-up action determination in the second embodiment are both met, it is possible to improve the accuracy of item pick-up action determination.

Third Embodiment

Figure 18:
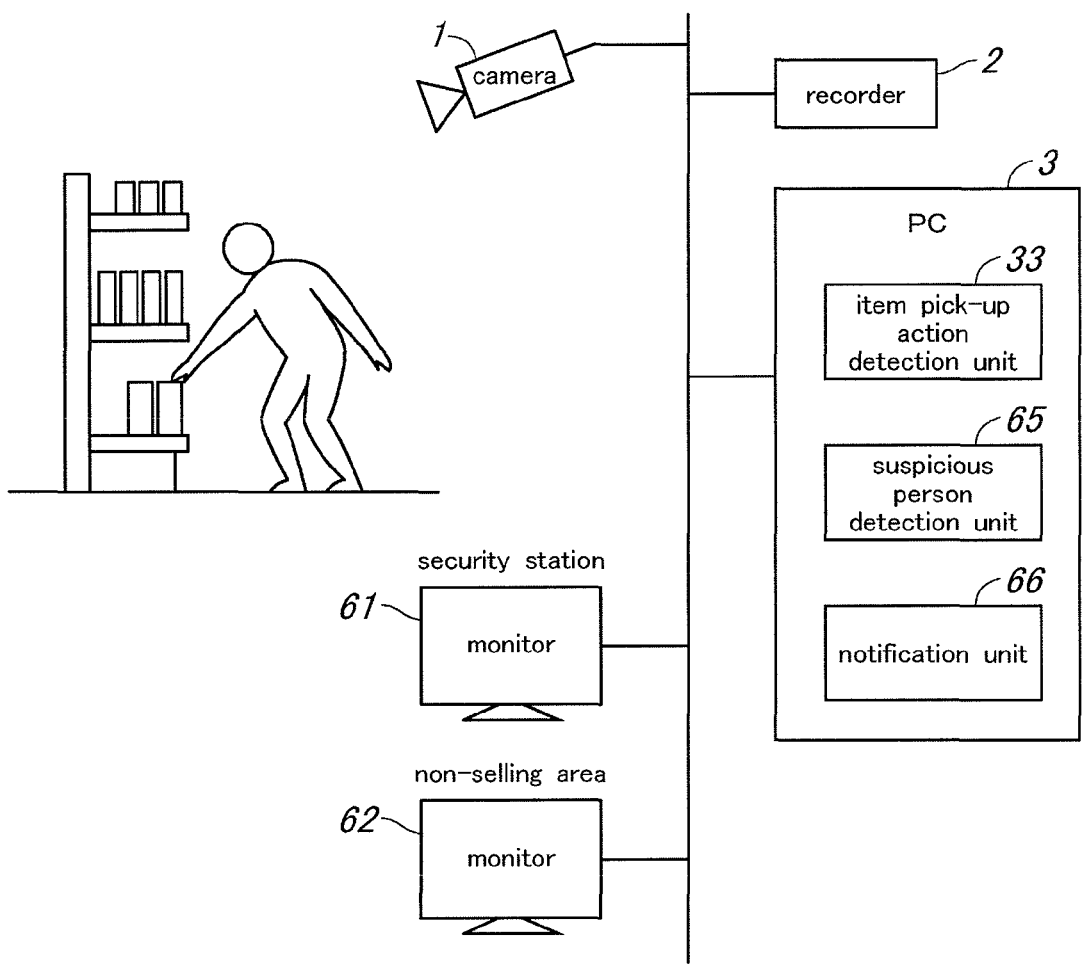
FIG. 18 is a diagram showing an overall structure of a monitoring system according to the third embodiment.

Next, a description will be given of a monitoring system according to the third embodiment. FIG. 18 is a diagram showing an overall structure of the monitoring system according to the third embodiment. The third embodiment is the same as the foregoing embodiments except for the points mentioned in the following description.

The monitoring system according to the third embodiment is to be used for the purpose of crime prevention in a retail store such as a supermarket, and is configured to detect a suspicious person in the store and to notify a monitoring person that there is a suspicious person. The monitoring system includes monitors (output device) 61, 62 set up in the security station and non-selling area, respectively, in addition to the camera (imaging device) 1, recorder 2 and PC (monitoring device) 3, which are connected via a network such as a LAN.

The monitors 61, 62 set up in the security station and non-selling area are configured to display captured images taken by the camera 1, so that a security guard at the security station and a store staff member, who are an example of the monitoring person, can observe the interior of the store.

The PC 3 includes a suspicious person detection unit 65 which detects a suspicious person based on the result of detection by the item pick-up action detection unit 33 and a notification unit 66 which generates notification information for notifying the monitoring person that there is a suspicious person. The notification information generated by the notification unit 66 is displayed on the monitors 61 and 62 set up in the security station and non-selling area.

When a person performing an item pick-up action to pick up an item on a display shelf is detected by the item pick-up action detection unit 33, the suspicious person detection unit 65 determines whether the person is a suspicious person based on the peculiarity of the item pick-up action performed by the person, and if it is determined that the person is a suspicious person, the notification unit 66 generates notification information to notify the monitoring person of the person determined to be suspicious. For example, if a person performed an item pick-up action repeatedly a predetermined number of times or more at the same display shelf, it is determined that the person is a suspicious person who might be committing "mass theft" or theft of many items at a time, and notification information relating to the person is generated.

FIG. 19 is an explanatory diagram showing display screens on the monitors 61 and 62 shown in FIG. 18, which are set up in the security station and non-selling area of the store, respectively. The monitors 61 and 62 set up in the security station and non-selling area, respectively, are caused to display screens indicating that there is a suspicious person based on the notification information generated by the notification unit 66. In the example shown in FIG. 19, a frame 71 surrounding the person determined to be suspicious is displayed as notification information in each of the display screens on the monitors 61 and 62. Thereby, a security guard at the security station and a store staff member can know that there is a suspicious person in the store.

In the present embodiment, screens are displayed such that the security guard at the security station can know that the store staff member has acknowledged the presence of the suspicious person and vice versa. In the example shown in FIG. 19, if the security guard acknowledges the suspicious person on the monitor 61 in the security station and performs an operation to enter the acknowledgment through an input device (not shown in the drawing), a screen frame 72 surrounding the captured image is displayed in the screen of the monitor 61. On the other hand, if the store staff member acknowledges the suspicious person on the monitor 62 in the non-selling area and performs an operation to enter the acknowledgment through an input device (not shown in the drawing), an icon 73 is displayed in the screen of the monitor 62.

Then, the screen frame 72 and icon 73 are displayed on each of the monitors 61 and 62 at the security station and non-selling area, whereby the icon 73 displayed on the monitor 61 at the security station allows the security guard to know that the store staff member has acknowledged the suspicious person while the screen frame 72 displayed on the monitor 62 in the non-selling area allows the store staff member to know that the security guard has acknowledged the suspicious person.

It is to be noted that in the present embodiment, notification information is displayed on the monitors 61, 62 provided as output devices for outputting notification information, but the output device that outputs the notification information is not limited thereto and may be embodied as a lamp, buzzer, etc.

As described above, in the present embodiment, even when neither the movement of the hand nor the movement of the arm can be detected, the item pick-up action detection unit 33 can determine whether an item pick-up action was performed, and this makes it possible to reliably notify the monitoring person of a person performing an item pick-up action.

In the foregoing, a description has been made of the present invention in terms of concrete embodiments thereof. However, these embodiments are mere examples and the present invention should not be limited to these embodiments. It should be noted that not all of the structural elements of the person behavior analysis device, person behavior analysis system, person behavior analysis method and monitoring device according to the present invention as illustrated in the foregoing embodiments are necessarily indispensable, and they may be selectively used as appropriate within the scope of the present invention.

For instance, in the foregoing embodiments, a description was given of an example in which the present invention was applied to a retail store such as a convenience store or a supermarket, but the present invention may be applied to a commercial establishment other than the retail store, such as a restaurant which may be a casual dining restaurant or the like. For example, the present invention may be applied to a configuration for detecting actions of customers of picking up food items at a self-service area (such as a salad bar or drink bar) where food items are offered for customers to serve themselves.

Further, in the foregoing embodiments, a configuration was provided to detect an item pick-up action of picking up an item placed on a display shelf, but the present invention may be applied to a configuration for detecting an item pick-up action of picking up an item placed in an item placement area other than the display shelf, such as a display table, bargain bin or the like.

Further, in the foregoing embodiments, it was assumed that those who perform an item pick-up action are customers of a store and items to be picked up are items for sale (commodities), the present invention may be applicable to a case where those who perform an item pick-up action are persons other than customers and items to be picked up are items that are not commodities. For example, the present invention may be used to detect an item pick-up action of picking up an exhibit in an exhibition such as an art exhibition.

Further, in the foregoing embodiments, the part of interest of a person observed in performing the item pick-up action determination was the head of the person, but the part of interest may be set in any part of the upper body excluding the hands and arms, and another part of the upper body, such as one or both of the left and right shoulder portions, may be used as the part of interest.

Further, in the foregoing embodiments, configuration was made to measure the position of the central point of the head (head center) as a representative point that represents the position of the head serving as the part of interest, but the representative point may be set at the top of the head. It is also possible to set multiple parts of interest in a part of the upper body excluding the hands and arms and to perform the item pick-up action determination based on the displacement of each of the multiple parts of interest.

Further, though in the foregoing embodiments, a description was made of an example in which the entirety of the person behavior analysis process was performed by the PC 3 set up at the store as shown in FIGS. 4 and 7, the entirety of the person behavior analysis process may be performed by another information processing device, such as the PC 11 set up at the management office or a cloud computer 21 forming a cloud computing system, as shown in FIG. 1, for example. Further, the person behavior analysis process may be performed by cooperation of multiple information processing devices, in which case, the multiple information processing devices are configured to be able to communicate or share information with each other via a communication medium such as an IP network or LAN or via a storage medium such as a hard disk or a memory card. Thereby, the multiple information processing devices jointly executing the person behavior analysis process constitute a person behavior analysis system.

In this case, it is preferred that the PC 3 set up at the store be configured to perform at least the person detection process or the part-of-interest detection process. In such a structure, since the detection information obtained by the person detection process or the part-of-interest detection process has a small amount of data, even if the remaining processes are performed by an information processing device set up at a place other than the store, such as the PC 11 set up at the management office, the communication load can be small, and thus, it is easy to operate the system in the form of a wide area network.

It may be also preferred that the cloud computer 21 be configured to perform at least the person detection process or the part-of-interest detection process. In such a structure, although the person detection process and the part-of-interest detection process require a large amount of computation, they are achieved by the information processing device constituting a cloud computing system, and therefore, it is not necessary to prepare a high-speed information processing device on the user side; namely at the store or the like. Further, since the remaining processes require a small amount of computation, the remaining processes can be performed as extended functions of an information processing device set up at the store to serve as the sales information management device, and this can reduce the cost born by the user.

The cloud computer 21 may be configured to perform the entirety of the person behavior analysis process. In such a structure, it becomes possible to view the analysis result on a mobile terminal such as a smartphone 22 in addition to the PC 3 set up at the store and the PC 11 set up at the management office, and this allows a user to view the analysis result not only at the store or the management office but also at any other place, such as a place the user is visiting on business.

Further, though in the foregoing embodiments, the PC 3 set up at the store and the PC 11 set up at the management office are used to view the analysis result, it is possible to provide a browser device for viewing the analysis result separately from the PCs 3 and 11. For example, it is possible to use a smartphone 22 as a browser device for viewing the analysis result as described in the foregoing, or to provide a sales information management device with a function of a browser device for viewing the analysis result. Further, though in the foregoing embodiments, the analysis result is displayed on the monitors 4 and 12 to enable a user to view the analysis result, it is possible to output the analysis result through a printer.

The person behavior analysis device, person behavior analysis system, person behavior analysis method, and monitoring device according to the present invention can advantageously detect an action of a person picking up an item placed in an item placement area even when neither the movement of the hand nor the movement of the arm of the person can be detected, and thus, are useful as a person behavior analysis device, person behavior analysis system and person behavior analysis method for performing analysis of item pick-up actions or actions of picking up an item placed in an item placement area, and a monitoring device for notifying a monitoring person of a person performing an item pick-up action.

The invention claimed is:

1. A person behavior analysis device for performing analysis of item pick-up actions, which are actions of picking up an item placed in an item placement area, the device comprising:
   a person detection processor configured to detect one or more persons from image information obtained by capturing images covering an area around the item placement area;
   a part-of-interest detection processor configured to detect, for each person detected by the person detection processor, a part of interest set only in a part of an upper body of the person excluding hands and arms;
   a position measurement processor configured to measure a position of the part of interest detected by the part-of-interest detection processor;

an item pick-up action determination processor configured to obtain a displacement of the part of interest based on the position of the part of interest obtained by the position measurement processor and to determine whether each person detected by the person detection processor performed an item pick-up action based on the displacement of the part of interest of the person; and an output information generation processor configured to generate output information representing a result of analysis based on a result of determination by the item pick-up action determination processor.

2. The person behavior analysis device according to claim 1, wherein the part of interest is a head or shoulder of a person.

3. The person behavior analysis device according to claim 1, wherein the item placement area includes a display shelf having a plurality of shelf boards on which items are placed such that the shelf boards are spaced apart in a vertical direction.

4. The person behavior analysis device according to claim 1, further comprising:

a vicinity area setting processor configured to set, around the item placement area, a vicinity area which is a maximum area in which a person can touch an item in the item placement area by extending a hand; and an area entry determination processor configured to determine that, of the persons detected by the person detection processor, a person who did not enter the vicinity area is a person who could not perform the item pick-up action.

5. The person behavior analysis device according to claim 4, wherein the vicinity area setting processor sets the vicinity area based on an arm length estimated from a result of measurement by the position measurement processor in accordance with correlation between height and arm length.

6. The person behavior analysis device according to claim 4, further comprising:

a staying time measurement processor configured to measure, for each person entering the vicinity area, a staying time in the vicinity area; and a staying time assessment processor configured to determine that, of the persons detected by the person detection processor, a person whose staying time does not reach a predetermined threshold value is a person who could not perform the item pick-up action.

7. The person behavior analysis device according to claim 4, wherein the item pick-up action determination processor determines whether each person entering the vicinity area performed the item pick-up action based on a displacement of the part of interest of the person with respect to a position of the part of interest when the person entered the vicinity area in an upright posture.

8. The person behavior analysis device according to claim 1, wherein the item pick-up action determination processor determines whether each person detected by the person detection processor performed the item pick-up action based on a positional relationship between a reference position set in the item placement area and the part of interest of the person.

9. The person behavior analysis device according to claim 2, wherein the position measurement processor measures a central point of a head of each person.

10. The person behavior analysis device according to claim 1, wherein the position measurement processor obtains information relating to an apparent size of the part of interest in captured images from the image information, and measures the position of the part of interest based on a change in the apparent size of the part of interest.

11. The person behavior analysis device according to claim 1, wherein:

the person detection processor detects a plurality of persons who are present in the vicinity of the item placement area at the same time;

the part-of-interest detection processor detects the part of interest of each person detected by the person detection processor;

the position measurement processor measures a position of the part of interest of each person detected by the part-of-interest detection processor; and the item pick-up action determination processor determines whether each person detected by the person detection processor performed the item pick-up action.

12. The person behavior analysis device according to claim 1, wherein:

a plurality of item placement areas are arranged for respective categories of items; and the output information generation processor generates output information relating to a result of totaling of at least one of a number of occurrences of item pick-up actions for each item placement areas and staying times of detected persons in an area around each item placement area.

13. The person behavior analysis device according to claim 12, wherein the output information generation processor generates output information relating to a display image for displaying the result of totaling superimposed on an image representing the plurality of item placement areas arranged in accordance with an actual arrangement of the item placement areas.

14. A person behavior analysis system for performing analysis of item pick-up actions, which are actions of picking up an item placed in an item placement area, the system comprising:

an imaging device configured to capture an image of an area around the item placement area; and a plurality of information processing devices, wherein the plurality of information processing devices jointly comprise:

a person detection processor configured to detect one or more persons from image information obtained by capturing images by the imaging device;

a part-of-interest detection processor configured to detect, for each person detected by the person detection processor, a part of interest set only in a part of an upper body of the person excluding hands and arms;

a position measurement processor configured to measure a position of the part of interest detected by the part-of-interest detection processor;

an item pick-up action determination processor configured to obtain a displacement of the part of interest based on the position of the part of interest obtained by the position measurement processor and to determine whether each person detected by the person detection processor performed an item pick-up action based on the displacement of the part of interest of the person; and an output information generation processor configured to generate output information representing a result of analysis based on a result of determination by the item pick-up action determination processor.

15. A person behavior analysis method for performing, with an information processing device, analysis of item pick-up actions, which are actions of picking up an item placed in an item placement area, the method comprising:
- detecting one or more persons from image information obtained by capturing images covering an area around the item placement area;
- detecting, for each person detected by the detecting of the one or more persons, a part of interest set only in a part of an upper body of the person excluding hands and arms;
- measuring a position of the part of interest detected by the detecting of the part of interest;
- obtaining a displacement of the part of interest from the position of the part of interest obtained by the measuring of the position of the part of interest and determining whether each person detected by the detecting of the one or more persons performed an item pick-up action based on the displacement of the part of interest of the person; and
- generating output information representing a result of analysis based on a result of determination by the obtaining of the displacement of the part of interest.

16. A monitoring device for notifying a monitoring person of a person performing an item pick-up action which is an action of picking up an item placed in a placement area, comprising:
- a person detection processor configured to detect one or more persons from image information obtained by capturing images covering an area around the item placement area;
- a part-of-interest detection processor configured to detect, for each person detected by the person detection processor, a part of interest set only in a part of an upper body of the person excluding hands and arms;
- a position measurement processor configured to measure a position of the part of interest detected by the part-of-interest detection processor;
- an item pick-up action determination processor configured to obtain a displacement of the part of interest based on the position of the part of interest obtained by the position measurement processor and to determine whether each person detected by the person detection processor performed an item pick-up action based on the displacement of the part of interest of the person; and
- a notification processor configured to generate notification information relating to a person performing the item pick-up action based on a result of determination by the item pick-up action determination processor.

17. The person behavior analysis device according to claim 1, wherein the part of interest is a head of the person.

18. The person behavior analysis system for performing analysis according to claim 14, wherein the part of interest is a head of the person.

19. The person behavior analysis method according to claim 15, wherein the detecting of the part of interest comprises detecting a head of the person.

20. The monitoring device according to claim 16, wherein the part of interest is a head of the person.

* * * * *